US007649644B2

(12) United States Patent
Minato

(10) Patent No.: US 7,649,644 B2
(45) Date of Patent: Jan. 19, 2010

(54) IMAGE PROCESSING DEVICE, IMAGE PROCESSING METHOD AND REMOTE-SCAN IMAGE PROCESSING SYSTEM USING THE SAME

(75) Inventor: Junichi Minato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 11/557,774

(22) Filed: Nov. 8, 2006

(65) Prior Publication Data

US 2007/0070415 A1   Mar. 29, 2007

Related U.S. Application Data

(62) Division of application No. 09/814,705, filed on Mar. 23, 2001, now Pat. No. 7,139,102.

(30) Foreign Application Priority Data

| May 2, 2000 | (JP) | ............................. 2000-133598 |
| Aug. 1, 2000 | (JP) | ............................. 2000-233323 |

(51) Int. Cl.
*H04N 1/00* (2006.01)
*H04N 1/387* (2006.01)
*G06F 15/00* (2006.01)
*G06K 15/00* (2006.01)

(52) U.S. Cl. ..................... 358/1.15; 358/1.16; 358/407; 358/452; 358/1.6

(58) Field of Classification Search ................. 358/407, 358/452, 401, 505, 403, 426.05, 400, 404, 358/444, 475, 443, 448, 1.6, 1.15, 1.16, 3.07; 382/312
See application file for complete search history.

(56) References Cited

U.S. PATENT DOCUMENTS

| 4,654,483 | A | | 3/1987 | Imai et al. |
| 4,760,458 | A | * | 7/1988 | Watanabe et al. ........... 358/537 |
| 5,845,076 | A | * | 12/1998 | Arakawa ..................... 709/203 |
| 5,936,746 | A | * | 8/1999 | Hirokawa .................... 358/468 |
| 5,973,791 | A | | 10/1999 | Yamamuro et al. |
| 6,072,599 | A | | 6/2000 | Oba et al. |
| 6,188,807 | B1 | * | 2/2001 | Arakawa ..................... 382/319 |
| 6,480,884 | B1 | | 11/2002 | Saito |
| 6,545,769 | B2 | | 4/2003 | Collard et al. |
| 6,618,366 | B1 | | 9/2003 | Furukawa et al. |
| 6,628,417 | B1 | | 9/2003 | Naito et al. |
| 6,856,431 | B2 | * | 2/2005 | Ohta .......................... 358/400 |
| 6,882,438 | B1 | * | 4/2005 | Kanaya ...................... 358/1.15 |
| 6,952,780 | B2 | * | 10/2005 | Olsen et al. ................... 726/26 |
| 6,965,958 | B1 | * | 11/2005 | Sugiyama ................... 710/104 |
| 2001/0030760 | A1 | * | 10/2001 | Ohta ........................... 358/1.9 |

(Continued)

*Primary Examiner*—Jerome Grant, II
(74) *Attorney, Agent, or Firm*—Oblon, Spivak, McClelland, Maier & Neustadt, L.L.P.

(57) ABSTRACT

In the image processing device, method and system of the present invention, a destination identifier of an image file is stored, the destination identifier indicating one of a plurality of external stations as a destination station which receives the image file from the image processing device through a network. At least one of a sender identifier of the image file, a subject identifier of the image file and a scan condition of the image file is stored. The image file is transmitted, together with at least one of the sender identifier, the subject identifier and the scan condition, through the network to one of the external stations indicated by the stored destination identifier.

21 Claims, 35 Drawing Sheets

U.S. PATENT DOCUMENTS

| | | |
|---|---|---|
| 2002/0057773 A1 | 5/2002 | Fujise et al. |
| 2002/0126322 A1 | 9/2002 | Kadowaki |
| 2003/0007170 A1 | 1/2003 | Kajita et al. |
| 2003/0043403 A1 | 3/2003 | Tashima |
| 2005/0167504 A1 | 8/2005 | Meier et al. |

* cited by examiner

FIG. 5

```
○ SELECT DESTINATION          MEMORY [100%]
■
DENSITY 4 , TEXT / PHOTO , 400dpi , AUTO / ONE-SIDE
    [SCAN]   [DESTN]   [SENDR]   [ONE / DUAL]
```

INITIAL MENU

FIG. 6

```
     DESTN PAGE : 01 " ← " KEY OR " → " KEY
  □ 01 PERSON-A        □ 02 PERSON-B
  □ 03 PERSON-C        □ 04 PERSON-D
                   [↓ NEXT]   [SELECT]   [END]
```

DESTINATION LIST

FIG. 7

```
     SENDR PAGE : 01 " ← " KEY OR " → " KEY
  □ 01 DEPT-A          □ 02 DEPT-B
  □ 03 DEPT-C          □ 04 DEPT-D
                   [↓ NEXT]   [SELECT]   [END]
```

SENDER LIST

FIG. 8

```
     SUBJT PAGE : 01 " ← " KEY OR " → " KEY
  □ 01 T / N           □ 02 DOC - B
  □ 03 DOC - C         □ 04 DOC - C
                   [↓ NEXT]   [SELECT]   [END]
```

SUBJECT LIST

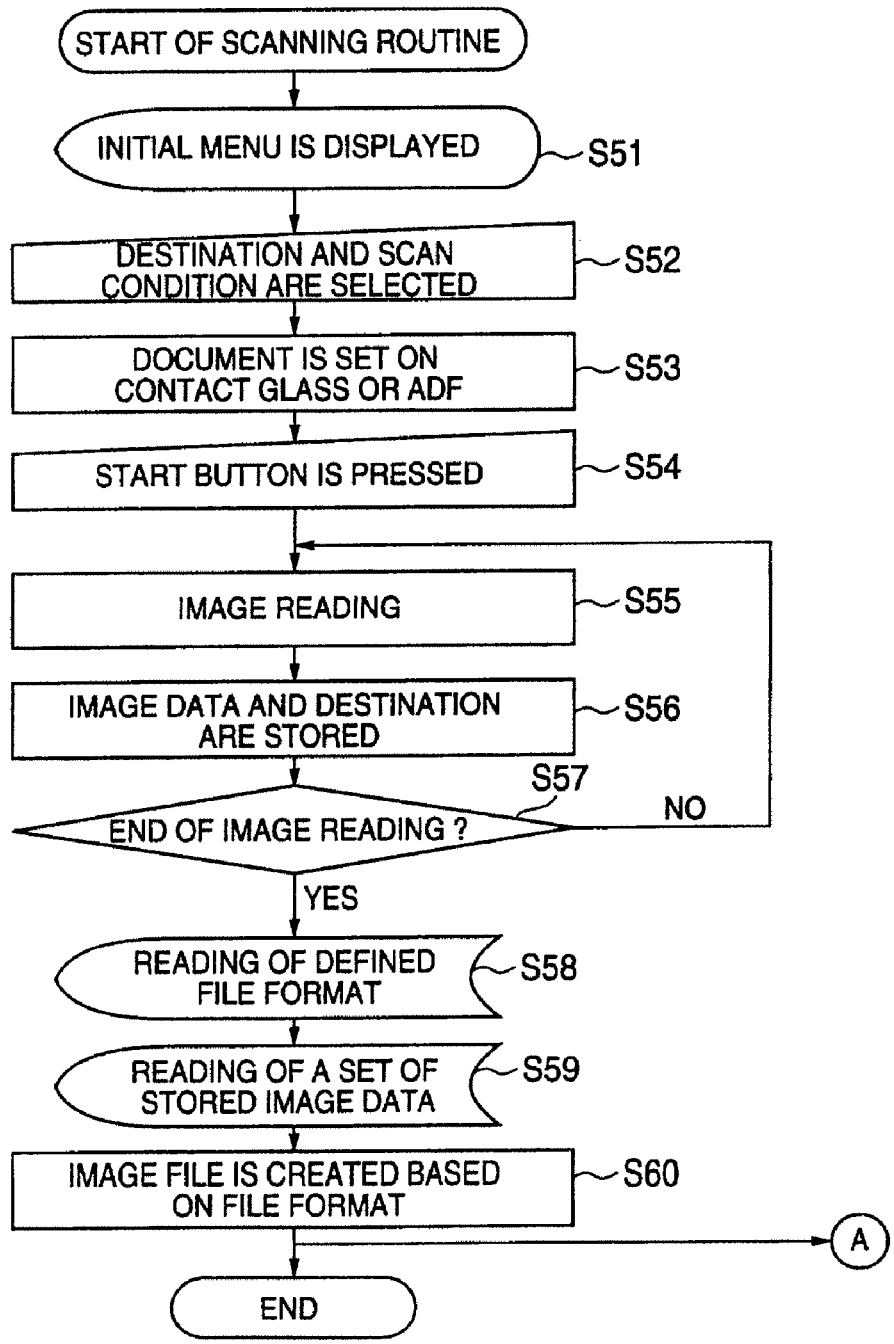

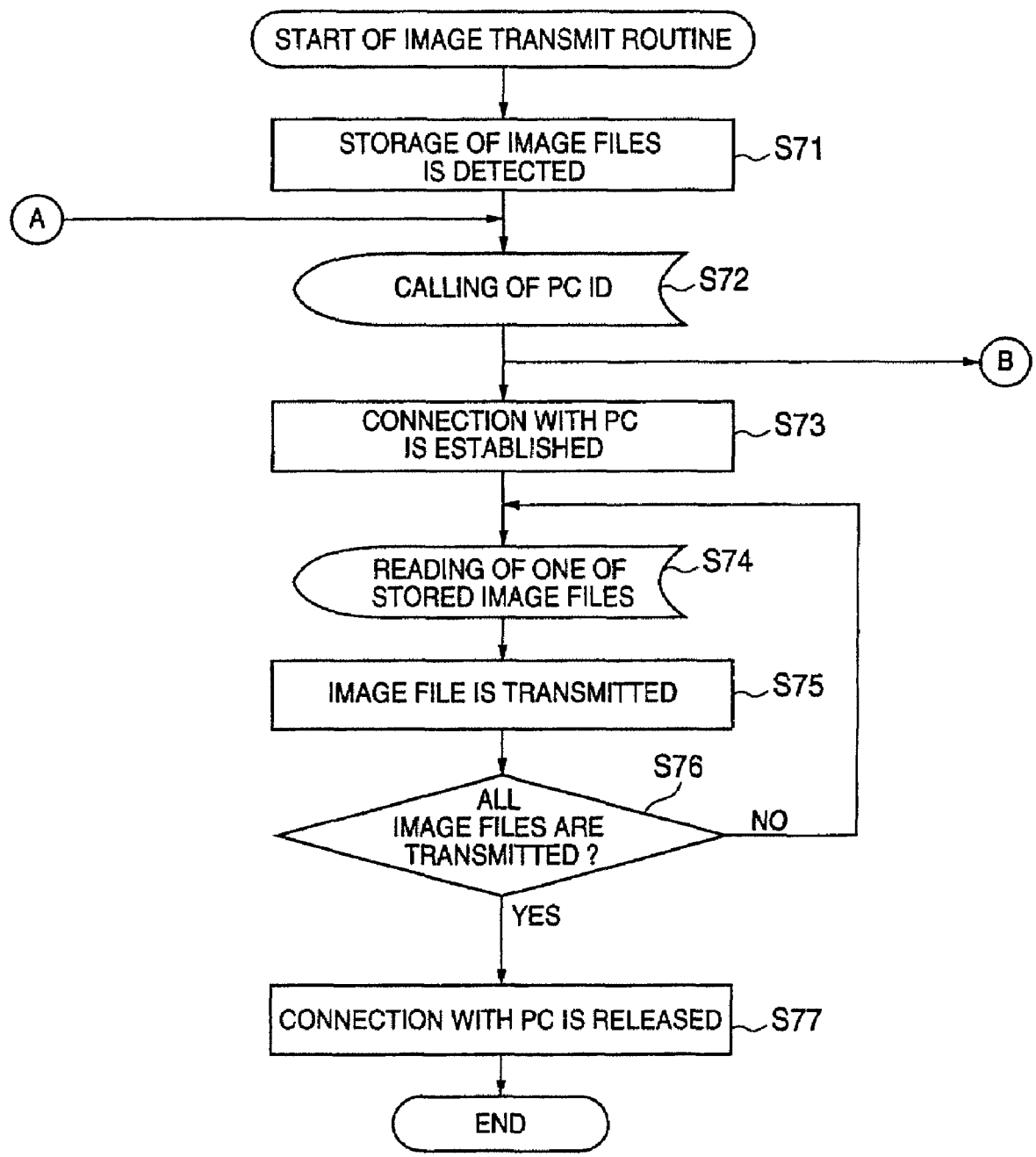

FIG. 17A

```
SCANNING                    MEMORY [100%]
─────────────────────────────────────────
NO. OF PAGES SCANNED : 00
PRESS STOP KEY IF CANCELLED
```

FIG. 17B

```
WAITING                     MEMORY [100%]
─────────────────────────────────────────
NO. OF PAGES SCANNED : 00
SET NEXT SHEET AND START
                                   [ END ]
```

FIG. 17C

```
SCANNING                    MEMORY [100%]
─────────────────────────────────────────
NO. OF PAGES SCANNED : 00
PRESS STOP KEY IF CANCELLED
```

FIG. 17D

```
WAITING                     MEMORY [100%]
─────────────────────────────────────────
NO. OF PAGES SCANNED : 00
SET NEXT SHEET AND START
                                   [ END ]
```

| | |
|---|---|
| 19990924171030-001.IMG | PAGE #1 IMAGE DATA FILE |
| 199909241710-001.PAGEINFO | PAGE #1 IMAGE FORMAT FILE |
| ⋮ | |
| 19990924171030-010.IMG | PAGE #10 IMAGE DATA FILE |
| 199909241710-010.PAGEINFO | PAGE #10 IMAGE FORMAT FILE |
| 19990924171030.DOCINFO | DOCUMENT INFORMATION FILE |

FIG. 23

○  READY

SELECT DOCUMENT FILE

[1] 19990924171030    [3] DOC-B
[2] DOC-A             [4] DOC-C

[ BACK ]  [ NEXT ]  [ OK ]  [ CANCEL ]

FIG. 24

⏻ SELECT DESTINATION         MEMORY [100%]
☐                            (◀ BACK ▶ NEXT)

DENSITY4 , TEXT / PHOTO , 400dpi , ▯ : AUTO

[ SCAN ]  [ DESTN ]  [ SENDR ]   ▯ ↔ ▯

↓ DESTN BUTTON ON          ↑ END BUTTON ON

DESTN PAGE : 01        ◀ KEY OR ▶ KEY

☐ 01 COMMON        ☐ 02 DEPT-A
☐ 03 DEPT-B        ☐ 04 DEPT-C

↑BACK   ↓ NEXT   [ SELECT ]   [ END ]

FIG. 25

19990924171030-001.IMG 199909241710-001.PAGEINFO

⋮

19990924171030-010.IMG 199909241710-010.PAGEINFO

DOCUMENT-001. IMG

DOCUMENT-001.PAGEINFO

19990924171030.DOCINFO

FIG. 31A

PLEASE INPUT
PERSONNEL ID
1 2 3 4 5

FIG. 31B

PLEASE INPUT
DOCUMENT NAME
X Y Z

FIG. 34A
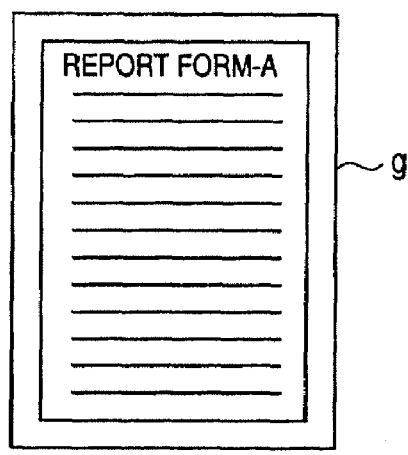
FIG. 34B
ABCDEFGHI
JKLMNOPQR
STUVWXYZ
. . . . . . . . .
. . . . . . . . .
. . . . . . . . .
END
FIG. 34C
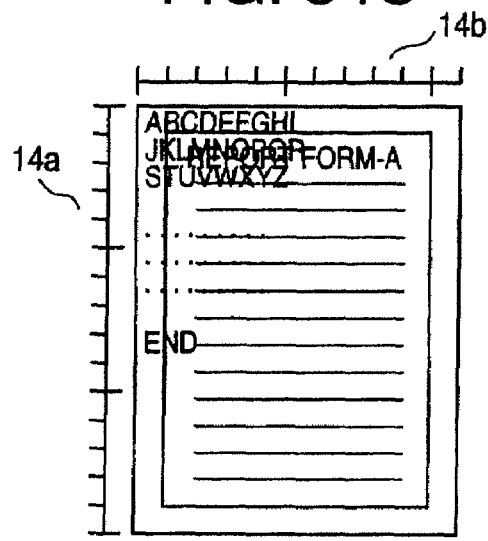
FIG. 34D
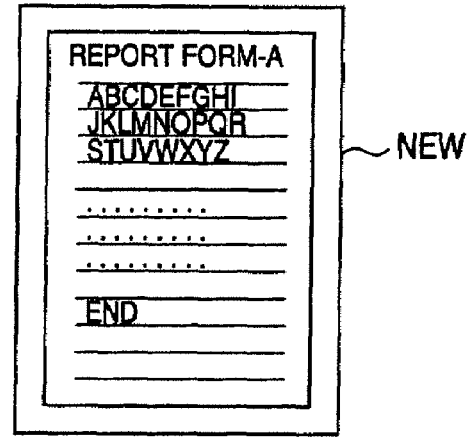

IMAGE PROCESSING DEVICE, IMAGE PROCESSING METHOD AND REMOTE-SCAN IMAGE PROCESSING SYSTEM USING THE SAME

CROSS-REFERENCE TO RELATED APPLICATIONS

The present application is a divisional of U.S. application Ser. No. 09/814,705 filed on Mar. 23, 2001, and in turn claims priority to JP 2000-133598 filed on May 2, 2000 and JP 2000-233323 filed on Aug. 1, 2000, the entire contents of each of which are hereby incorporated herein by reference.

BACKGROUND OF THE INVENTION

1. Field of the Invention

The present invention relates to an image processing device and method for use in a remote-scan image processing system wherein image data, read from documents by using a scanner unit (or a digital still camera or a video camera) of the image processing device, are transmitted from the image processing device to an external computer among a plurality of external computers across a network. Further, the present invention relates to a remote-scan image processing system using the image processing device and method.

2. Description of the Related Art

In recent years, the wide-spread use of personal computers (PC) and local area networks (LAN) makes it possible that a remote-scan image processing system transmit image data, read from documents by using a scanner unit (or a video camera or a digital still camera), from an image processing device to a desired external computer (the destination) among a plurality of external computers across a local area network.

When transmitting an image file from the image processing device to the destination (the desired one among the plurality of personal computers) in a small-office LAN environment, there is a case in which the receiver workstation is the same as the sender workstation. When transmitting a fax to a desired external station, the receiver which receives the fax is normally external equipment outside the LAN, and it is necessary that the identification of the sender be included in the transmitted fax, in order to inform the receiver who has sent the fax.

If an image file is transmitted to the receiver's PC without indication of the sender's identification or the like, it is inconvenient to the receiver, and the purpose of the transmission of the image file in such a case is unclear to the receiver. If the image file is transmitted to the receiver's PC with a clear indication of the sender's identification and it is recognizable to the receiver before opening of the received image file, the convenience of the remote scanning capability of the image processing system to the users would be increased.

Further, when transmitting a fax to a desired external station, the image of the transmitted fax is simply printed at the receiver's equipment. However, when transmitting an image file from the image processing device to the desired external computer across the LAN, it is desired to cause the receiver's computer to perform various post-processing procedures of the image file after the reception of the image file at the receiver's computer, in order to increase the convenience of the image processing system's remote scanning to the users.

SUMMARY OF THE INVENTION

It is an object of the present invention to provide an improved image processing device, an improved image processing method and an improved image processing system in which the above-described problems are eliminated.

Another object of the present invention is to provide an image processing device that allows the receiver of the image file to immediately recognize the sender's identification, in order to increase the convenience of the remote scanning capability to the users.

Another object of the present invention is to provide an image processing device that allows the receiver of the image file to immediately overview the contents of the image file or the like, in order to increase the convenience of the remote scanning capability to the users.

Another object of the present invention is to provide an image processing device that allows the receiver's computer to perform various post-processing procedures of the image file after the reception of the image file, in order to increase the convenience of the remote scanning capability to the users.

Another object of the present invention is to provide an image processing method that allows the receiver of the image file to immediately recognize the sender's identification, in order to increase the convenience of the remote scanning capability to the users.

Another object of the present invention is to provide an image processing method that allows the receiver of the image file to immediately overview the contents of the image file or the like, in order to increase the convenience of the remote scanning capability to the users.

Another object of the present invention is to provide an image processing method that allows the receiver's computer to perform various post-processing procedures of the image file after the reception of the image file, in order to increase the convenience of the remote scanning capability to the users.

Another object of the present invention is to provide a remote-scan image processing system which allows the receiver of the image file to immediately recognize the sender's identification, in order to increase the convenience of the remote scanning capability to the users.

Another object of the present invention is to provide a remote-scan image processing system which allows the receiver of the image file to immediately overview the contents of the image file or the like, in order to increase the convenience of the remote scanning capability to the users.

Another object of the present invention is to provide a remote-scan image processing system which allows the receiver's computer to perform various post-processing procedures of the image file after the reception of the image file, in order to increase the convenience of the remote scanning capability to the users.

The above-mentioned objects of the present invention are achieved by an image processing device which transmits an image file to one of a plurality of external stations through a network, the image processing device comprising: a destination registering unit which stores a destination identifier of the image file, the destination identifier indicating one of the external stations to which the image file is transmitted from the image processing device; a sender registering unit which stores a sender identifier of the image file, the sender identifier indicating a person or group who sends the image file to said one of the external stations; and a transmission unit which transmits the image file, together with the stored sender identifier, through the network to said one of the external stations indicated by the stored destination identifier.

The above-mentioned objects of the present invention are achieved by an image processing method which transmits an image file to one of a plurality of external stations through a network, the image processing method comprising the steps of: storing a destination identifier of the image file, the destination identifier indicating one of the external stations to which the image file is transmitted from the image processing device; storing at least one of a sender identifier of the image file, a subject identifier of the image file and a scan condition of the image file; and transmitting the image file, together with said at least one of the sender identifier, the subject identifier and the scan condition, through the network to said one of the external stations indicated by the stored destination identifier.

The above-mentioned objects of the present invention are achieved by a remote-scan image processing system including an image processing device and a plurality of external stations connected to the image processing device through a network, the image processing device comprising: a scanner unit which photoelectrically scans a document to read image data from the document, the scanner unit provided with an automatic document feeder transporting the document to the scanner unit before the reading of the image data; an image memory which stores the image data read by the scanner unit; a transmission unit which transmits an image file derived from the image data stored in the image memory, to one of the plurality of external stations through the network; and an operation unit which input key-in information to select one of the external stations as a destination station which receives the image file, wherein the one of the external stations receives the image file, transmitted by the transmission unit, in accordance with a selected file format, and the one of the external stations comprises a file format selection unit selecting one of a plurality of file formats as conforming to the image file transmitted by the image processing device.

In the image processing device, method and system of the present invention, a destination identifier of the image file to be transmitted is stored, a sender identifier of the image file is stored, and the image file is transmitted, together with the stored identifier, through the network to one of the plurality of external computers. According to the image processing device, the image processing method and the remote-scan image processing system of the present invention, it is possible that the receiver of the image file immediately recognize the identifier of the sender, the image subject or the scan condition, in order to increase the convenience of the remote scanning capability to the users. The image processing device, method and system of the present invention are effective in enabling the receiver of the image file to immediately overview the contents of the image file or the like, so as to increase the convenience of the remote scanning capability to the users. The image processing device, method and system of the present invention are effective in enabling the receiver's computer to perform various post-processing procedures of the image file after the reception of the image file, in order to increase the convenience of the remote scanning capability to the users.

BRIEF DESCRIPTION OF THE DRAWINGS

Other objects, features and advantages of the present invention will be apparent from the following detailed description when read in conjunction with the accompanying drawings.

FIG. 5 is a diagram for explaining an initial-menu screen displayed on a display unit of the image processing device of the present embodiment.

FIG. 6 is a diagram for explaining a destination list screen displayed on the display unit of the image processing device of the present embodiment.

FIG. 7 is a diagram for explaining a sender list screen displayed on the display unit of the image processing device of the present embodiment.

FIG. 8 is a diagram for explaining a subject list screen displayed on the display unit of the image processing device of the present embodiment.

FIG. 9 is a diagram for explaining a scan condition list screen displayed on the display unit of the image processing device of the present embodiment.

FIG. 10 is a flowchart for explaining a scanning procedure executed by a second preferred embodiment of the image processing system of the invention.

FIG. 11 is a flowchart for explaining an image file transmission procedure executed by the image processing system of the present embodiment.

FIG. 17A, FIG. 17B, FIG. 17C and FIG. 17D are diagrams for explaining various operational screens displayed in the image processing device of the present embodiment.

FIG. 23 is a diagram for explaining an operational screen displayed in the image processing device of the present embodiment.

FIG. 24 is a diagram for explaining operational screens displayed in the image processing device of the present embodiment.

FIG. 25 is a diagram for explaining a structure of image files stored in the image memory of the image processing device of the present embodiment.

FIG. 31A and FIG. 31B are diagrams for explaining input screens displayed in the image processing device of the present embodiment.

FIG. 34A, FIG. 34B, FIG. 34C and FIG. 34D are diagrams showing an example of the file combining process in which plural document files are combined together.

DETAILED DESCRIPTION OF PREFERRED EMBODIMENTS

A description will now be provided of preferred embodiments of the present invention with reference to the accompanying drawings.

Figure 1:
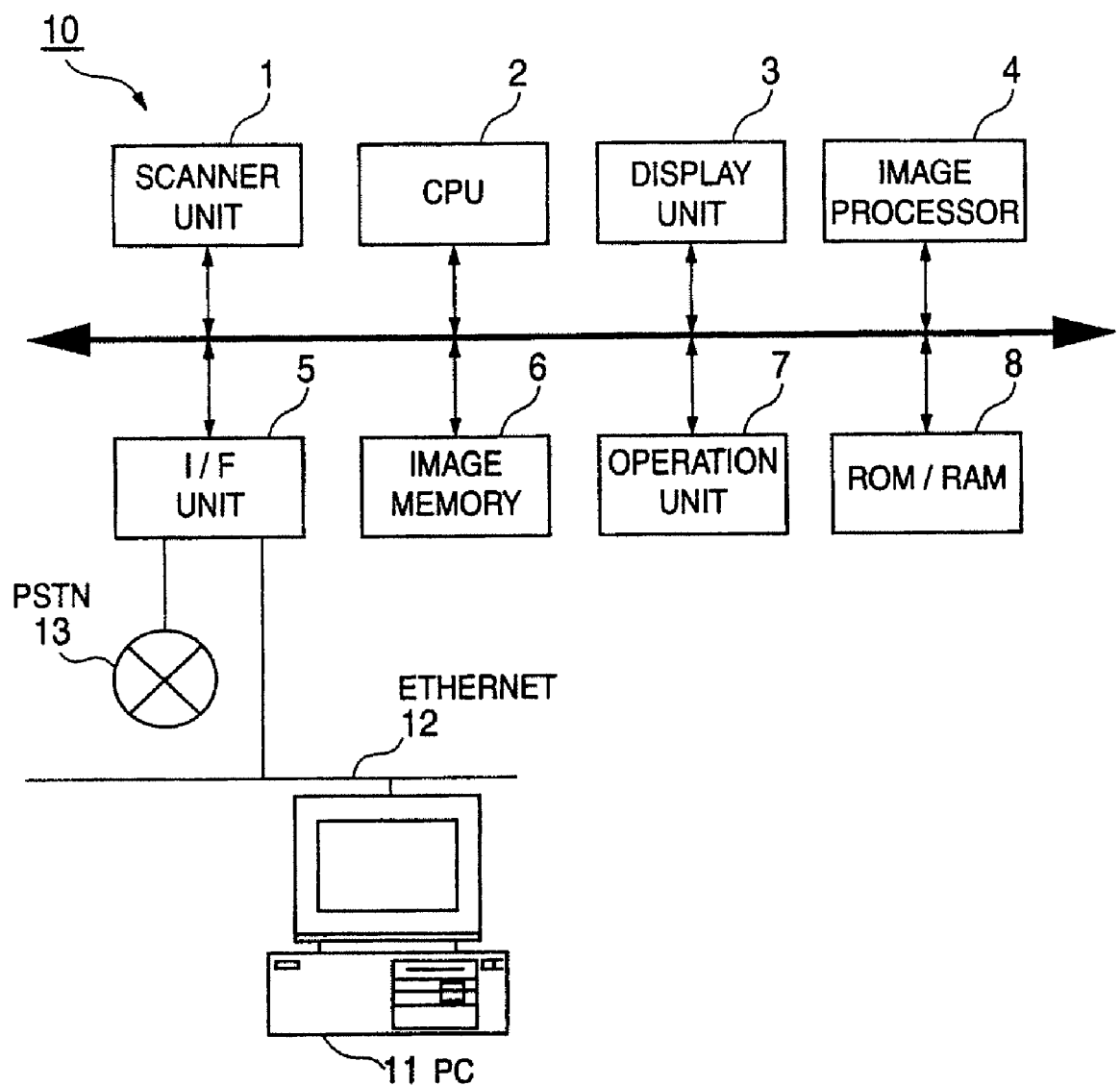
FIG. 1 is a block diagram of a first preferred embodiment of the remote-scan image processing system of the invention.

FIG. 1 shows a first preferred embodiment of the remote-scan image processing system of the invention. A description will be given, with reference to FIG. 1 through FIG. 9, of the first preferred embodiment of the remote-scan image processing system of the invention.

In the remote-scan image processing system of the present embodiment, an image processing device 10 and a plurality of external computers (PC) 11, which are connected to the image processing device 10 through a local area network 12 (e.g., the Ethernet), are provided. For the sake of simplicity of description, only one of the plurality of external computers 11 is shown in FIG. 1, and the other external computers 11 are omitted. The image processing device 10, shown in FIG. 1, is one embodiment of the image processing device of the present invention.

As shown in FIG. 1, the image processing device 10 generally includes a scanner unit 1, a CPU (central processing unit) 2, a display unit 3, an image processor 4, a network I/F (interface) unit 5, an image memory 6, an operation unit 7, and a ROM/RAM (read-only memory/random access memory) 8 are provided. These elements of the image processing device 10 are interconnected by a local bus as shown in FIG. 1.

As shown in FIG. 1, the network I/F unit 5 serves to connect the image processing device 10 to a selected one of the local area network 12 and a PSTN (public switched telephone network) 13. In the present embodiment, the network 12 is a known Ethernet network. When the image processing device 10 is connected to the PC 11 via the network 12, a connection of the image processing device 10 and the PC 11 via the network 12 is established by the network I/F unit 5. When the image processing device 10 is connected to external equipment (not shown) via the PSTN 13, a connection of the image processing device 10 and the external equipment via the PSTN 14 is established by the network I/F unit 5.

Suppose that address directory lists related to the PC 11, including a destination list, a sender list, an image subject list and a scan condition list, are stored, in advance, in the ROM/RAM 8. A network administrator (or an operator) causes the remote-scan image processing system to store, in advance, the destination list, the sender list, the image subject list and the scan condition list, which are related to the PC 11, into the ROM/RAM 8 of the image processing device 10 by making use of a registering program from the ROM/RAM 8. A shared use of these lists for the small-office home-office application and for the wide area network application is considered by using a common entry for the same sender identifier, and the need for performing a duplicate list storing procedure will be eliminated.

A description will be given of operations of the remote-scan image processing system of the present embodiment.

Figure 2:
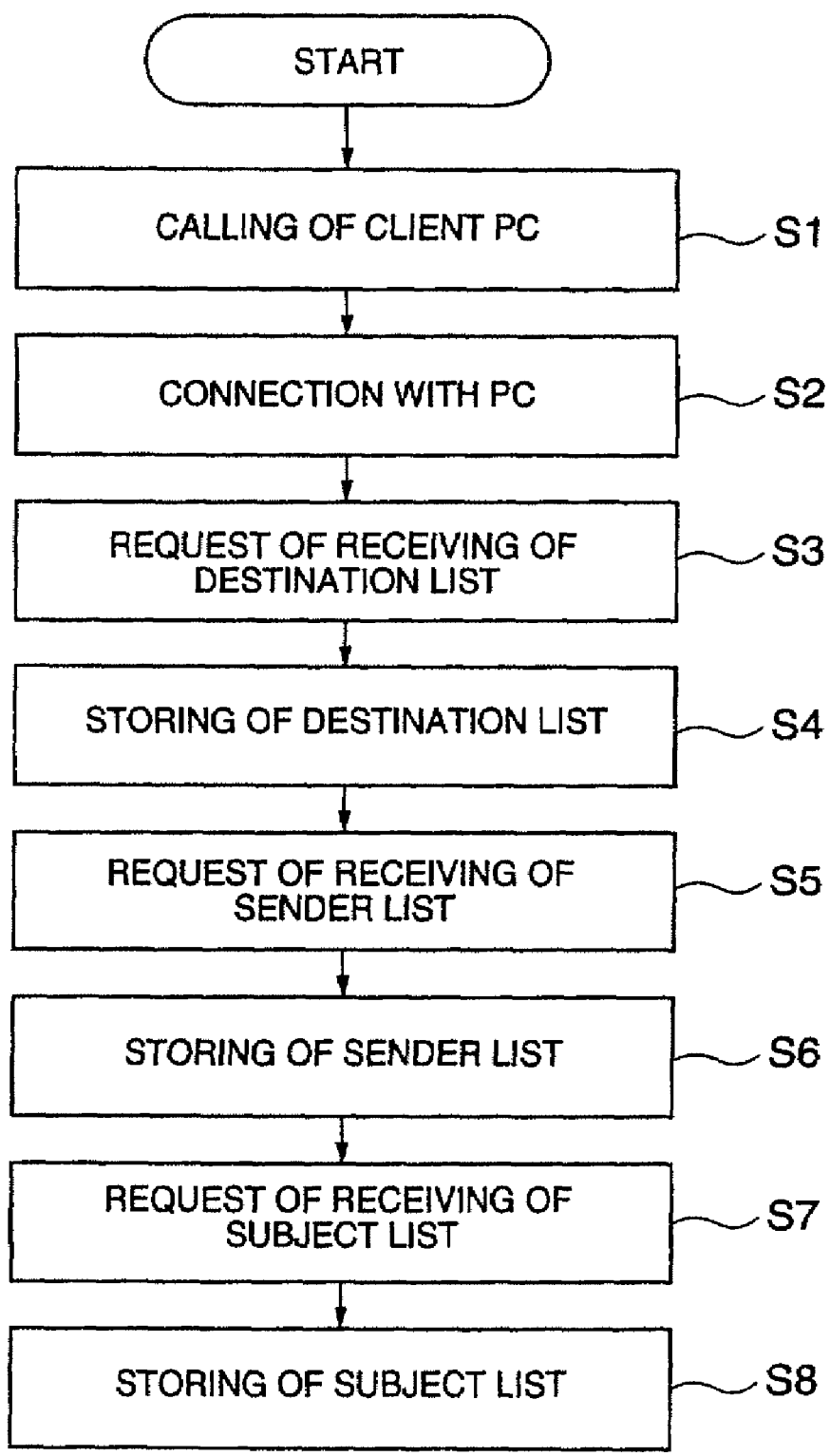
FIG. 2 is a flowchart for explaining a list storing procedure executed by the image processing device of the present embodiment to store a destination list, a sender list and an image subject list.

FIG. 2 shows a list storing procedure executed by the remote-scan image processing system of the present embodiment. When the list storing procedure of FIG. 2 is executed, a destination list, a sender list and an image subject list which are received from the related external computer 11 via the network 12 are temporarily stored into the image processing device 10.

When a power switch of the image processing device 10 is turned on by the network administrator (or the operator), the list storing procedure, shown in FIG. 2, is started. At a start of the list storing procedure, the CPU 2 of the image processing device 10 (which will called the CPU 2) sends a call to a registered PC (the external computer) 11 in the network 12 (S1). After step S1 is performed, the CPU 2 causes the network I/F unit 5 to establish a connection of the image processing device 10 and the external computer 11 (S2). The CPU 2 sends a request of receiving of a destination list related to the external computer 11, to the external computer 11 (S3). The destination list contains a set of destination identifiers, and each destination identifier indicates one of the plurality of external computers in the network 12 to which an image file is transmitted from the image processing device 10.

After step S3 is performed, the CPU 2 stores the destination list, received from the external computer 11, into the ROM/RAM 8 (S4). Then, the CPU 2 sends a request of receiving of a sender list related to the external computer 11, to the external computer 11 (S5). The sender list contains a set of sender identifiers, and each sender identifier indicates one of a plurality of sender personnel or groups who send an image file from the image processing device 10 to the destination computer 11 in the network 12.

After step S5 is performed, the CPU 2 stores the sender list, received from the external computer 11, into the ROM/RAM 8 (S6). Then, the CPU 2 sends a request of receiving of an image subject list related to the image file being transmitted, to the external computer 11 (S7). The image subject list contains a set of image subject identifiers, and each subject identifier indicates one of a plurality of image subject indications which indicate the names of the images in the image file being transmitted.

After step S7 is performed, the CPU 2 stores the image subject list, received from the external computer 11, into the ROM/RAM 8 (S8). After step S8 is performed, the list storing procedure of FIG. 2 is finished.

Figure 3:
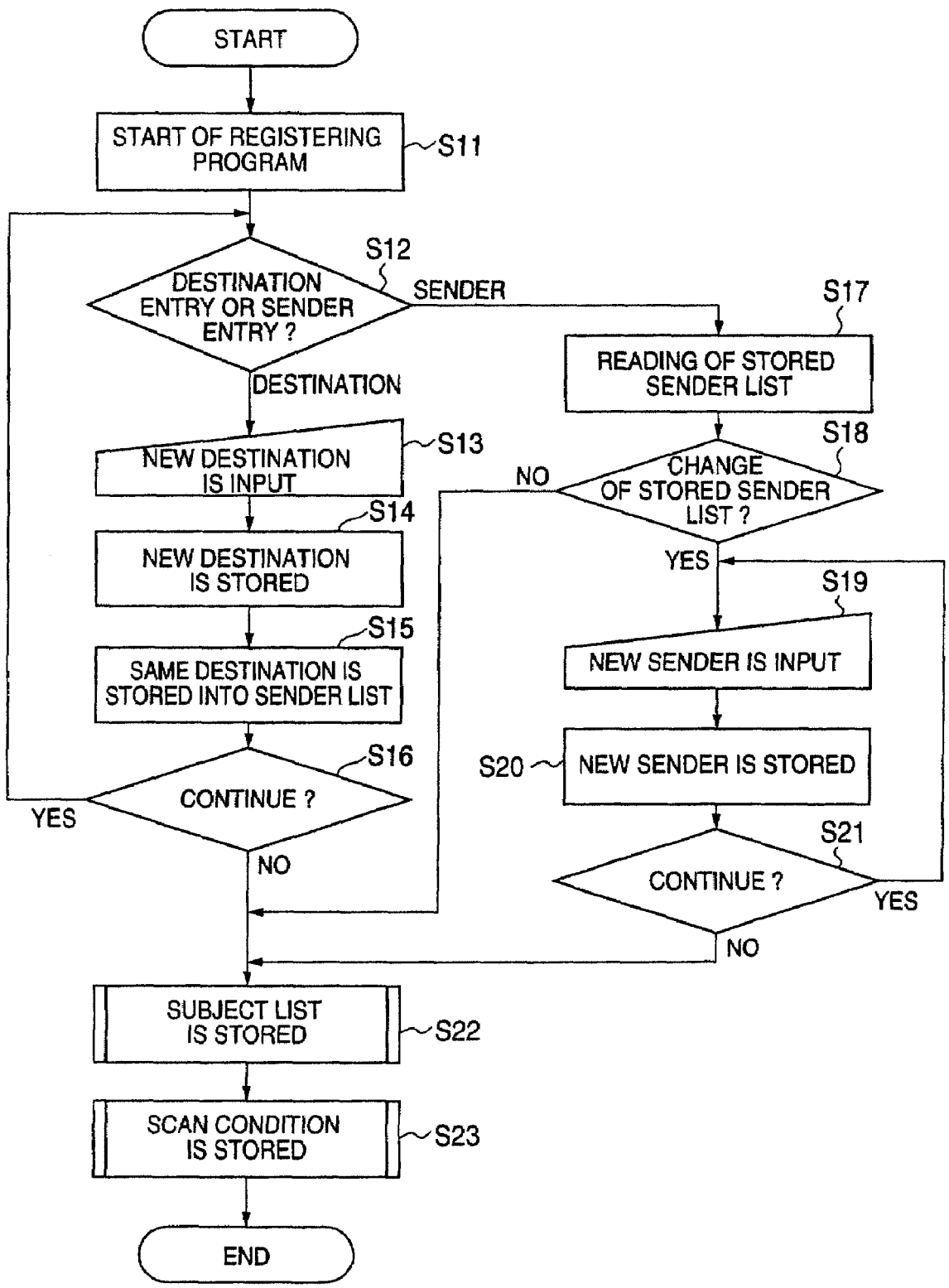
FIG. 3 is a flowchart for explaining a registering procedure executed by the image processing device of the present embodiment.

When the list storing procedure of FIG. 2 is finished, the CPU 2 of the image processing device 10 performs a registering procedure based on the stored destination list and the stored sender list. FIG. 3 shows a registering procedure executed by the image processing system of the present embodiment.

As shown in FIG. 3, at a start of the registering procedure, the CPU 2 starts execution of a registering program read from the ROM/RAM 8 (S11). After step S11 is performed, the CPU 2 causes the operator to select one of a destination entry or a sender entry for subsequent operations (S12). When the destination entry is selected as a result of step S12, the CPU 2 performs step S13 and subsequent steps. The CPU 2 causes the operator to input a new destination identifier from the operation unit 7 (S13). The CPU 2 stores the new destination identifier, input by the operator from the operation unit 7, into the destination list previously stored (S14). The CPU 2 stores the same destination identifier, input by the operator from the operation unit 7, into the sender list previously stored (S15). After step S15 is performed, the CPU 2 causes the operator to determine whether the operator wishes to continue to perform the destination entry operation (S16). When the result at step S16 is affirmative, the control of the CPU 2 is transferred to the step S12. Otherwise the CPU 2 performs the next step S22.

On the other hand, when the sender entry is selected as a result of step S12, the CPU 2 performs step S17 and subsequent steps. The CPU 2 reads the previously stored sender list from the ROM/RAM 8 so that the contents of the sender list are displayed on the display unit 3 (S17). The CPU 2 causes the operator to determine whether the operator wishes to change the stored sender list (S18). When the result at step S18 is negative, the control of the CPU 2 is transferred to the step S22. Otherwise the CPU 2 performs the next step S19. The CPU 2 causes the operator to input a new sender identifier from the operation unit 7 (S19). The CPU 2 stores the new sender identifier, input by the operator from the operation unit 7, into the sender list previously stored (S20). After step S20 is performed, the CPU 2 causes the operator to determine whether the operator wishes to continue to perform the sender entry operation (S21). When the result at step S21 is affirmative, the control of the CPU 2 is transferred to the step S19. Otherwise the CPU 2 performs the next step S22.

When the result at one of the steps S16, S18 and S21 is negative, the CPU 2 performs a subject list entry and storing process by using the registering program (S22). The subject list entry and storing process is performed, in advance, by the network administrator when the image subject list of the image file is managed on the side of the external computer 11. After step S22 is performed, the CPU 2 performs a scan condition entry and storing process by using the registering program (S23). When scan conditions are predetermined, a scan condition selection list (which includes, for example, 100 dpi for thumbnail (T/N) images, 300 dpi for OCR images and 600 dpi for album images) is displayed, during the scan condition entry and storing process of the step S23, and the operator is caused to select one from among those of the scan condition selection list.

Figure 4:
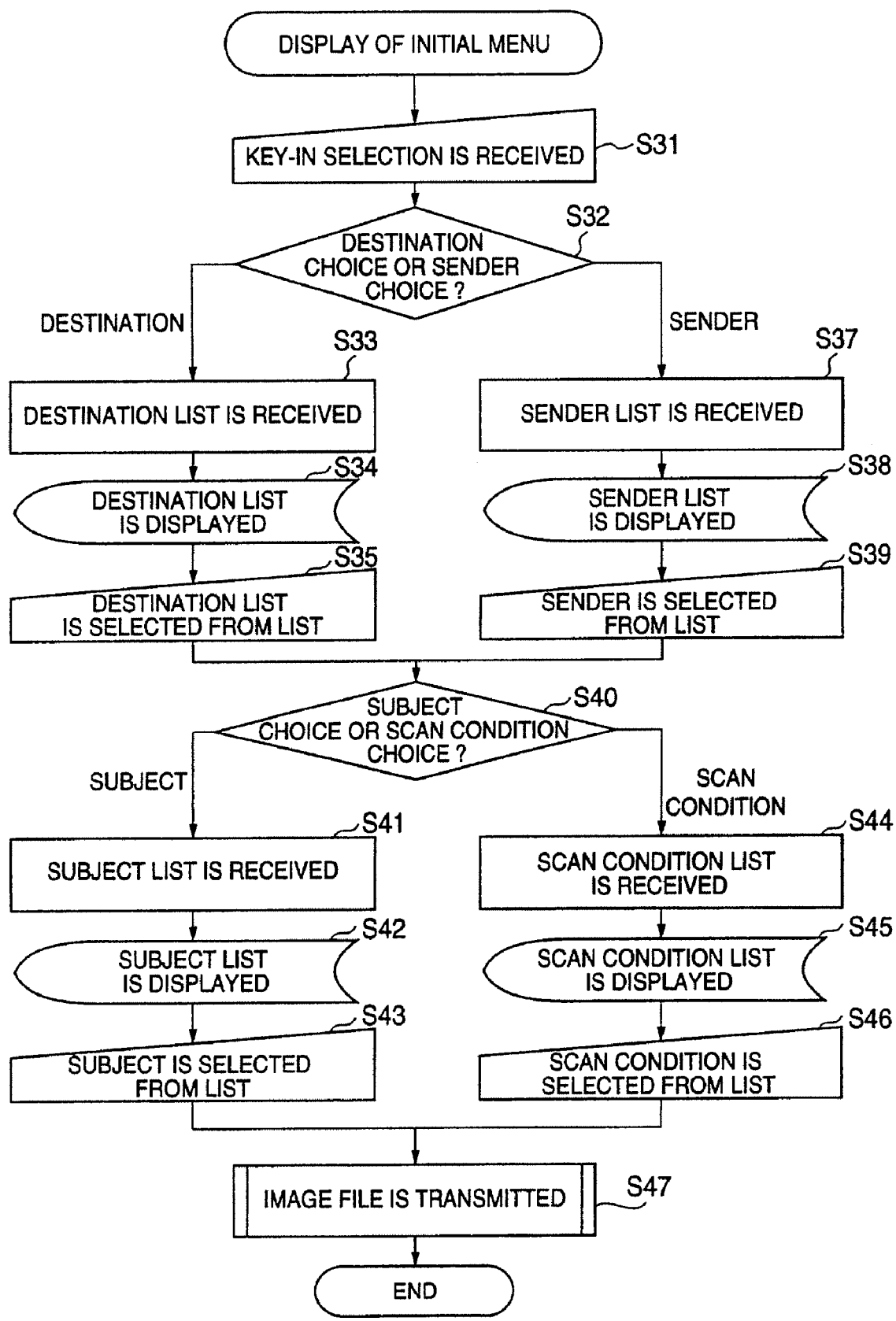
FIG. 4 is a flowchart for explaining an image file transmission procedure executed by the image processing device of the present embodiment.

FIG. 4 shows an image file transmission procedure executed by the image processing system of the present embodiment.

At a start of the image file transmission procedure of FIG. 4, an initial-menu screen is displayed on the display unit 3 of the image processing device 10. FIG. 5 shows the initial-menu screen displayed on the display unit of the image processing device of the present embodiment. As shown in FIG. 5, the operator can select the following items from the initial-menu screen: a text/photograph choice ("TEXT/PHOTO"), a resolution choice ("400 dpi"), a document auto-feed/one-side feed choice ("AUTO/ONE-SIDE"), a scan condition list selection ("SCAN"), a destination list selection ("DESTN"), a sender list selection ("SENDR"), and a one-side/dual-side selection ("ONE/DUAL").

As shown in FIG. 4, the CPU 2 receives a key-in selection from the operation unit 7 (S31). The CPU 2 determines which of the destination list selection or the sender list selection is input by the operator from the operation unit 7 (S32). When the destination list selection is input by the operator, the CPU 2 performs the next step S33 and subsequent steps. When the sender list selection is input by the operator, the CPU 2 performs the next step S37 and subsequent steps.

When the destination list selection is input by the operator as a result of the step S32, the CPU 2 receives the destination list from the ROM/RAM 8 (S33). The CPU 2 displays the destination list, received from the ROM/RAM 8, on the display unit 3 (S34).

FIG. 6 shows a destination list screen displayed on the display unit 3 of the image processing device 10 of the present embodiment. The CPU 2 causes the operator to select a desired destination from among a plurality of destination identifiers of the destination list displayed on the display unit 3 (S35). After step S35 is performed, the CPU performs the next step S40 and subsequent steps, which will be described below.

When the sender list selection is input by the operator as a result of the step S32, the CPU 2 receives the sender list from the ROM/RAM 8 (S37). The CPU 2 displays the sender list, received from the ROM/RAM 8, on the display unit 3 (S38).

FIG. 7 shows a sender list screen displayed on the display unit 3 of the image processing device 10 of the present embodiment. After step S38 is performed, the CPU 2 causes the operator to select a desired sender from among a plurality of sender identifiers of the sender list displayed on the display unit 3 (S39). After step S39 is performed, the CPU 2 performs the next step S40 and subsequent steps, which will be described below.

In the destination and sender list screens shown in FIG. 6 and FIG. 7, "next" button is provided to indicate the next page of the related list when depressed, "select" button is provided to select the desired destination or sender from the destination or sender list when depressed, and "end" button is provided to finalize the selected item from the related list when depressed. After the "end" button is depressed, the indication of the display unit 3 is returned to the initial menu shown in FIG. 5, which allows the operator to select another item by depressing any of the various list selection buttons. In the present example, the operator first selects the destination identifier from the destination list, and depresses the "end" button so that the indication of the display unit 3 is returned to the initial menu, and then the operator selects any of the sender, the scan condition and the image subject starting from the initial menu.

With the initial menu displayed, the CPU 2 determines which of the image subject choice or the scan condition choice is input by the operator from the operation unit 7 (S40). When the image subject choice is input by the operator, the CPU 2 performs the next step S41 and subsequent steps. When the scan condition choice is input by the operator, the CPU 2 performs the next step S44 and subsequent steps.

When the image subject choice is input by the operator as a result of the step S40, the CPU 2 receives the image subject list from the ROM/RAM 8 (S41). The CPU 2 displays the image subject list, received from the ROM/RAM 8, on the display unit 3 (S42).

FIG. 8 shows an image subject list screen displayed on the display unit 3 of the image processing device 10 of the present embodiment. The "next" button, the "select" button and the "end" button of the list screen shown in FIG. 8 are the same as the corresponding buttons shown in FIG. 6 or FIG. 7. The CPU 2 causes the operator to select a desired image subject from among a plurality of image subjects of the image subject list displayed on the display unit 3 (S43). After step S43 is performed, the CPU performs the next step S47, which will be described below.

When the scan condition choice is input by the operator as a result of the step S40, the CPU 2 receives the scan condition list from the ROM/RAM 8 (S44). The CPU 2 displays the scan condition list, received from the ROM/RAM 8, on the display unit 3 (S45).

FIG. 9 shows a scan condition list screen displayed on the display unit 3 of the image processing device 10 of the present embodiment. The "next" button, the "select" button and the "end" button of the list screen shown in FIG. 9 are the same as the corresponding buttons shown in FIG. 6 or FIG. 7. After step S45 is performed, the CPU 2 causes the operator to select a desired scan condition from among a plurality of scan conditions of the scan condition list displayed on the display unit 3 (S46).

After the step S43 or the step S46 is performed, the CPU 2 performs an image file transmission procedure (S47). In the present embodiment, the image file is transmitted, together with any of the selected sender identifier, the selected image subject and the selected scan condition, through the network 12 to the external computer 11 (the destination) among the external computers.

According to the image processing device, the image processing method and the remote-scan image processing system of the present invention, it is possible that the receiver of the image file immediately recognize the sender or scan condition or image subject identification, in order to increase the convenience of the remote scanning capability to the users.

Next, a description will be given, with reference to FIG. 10 through FIG. 19D, of a second preferred embodiment of the remote-scan image processing system of the invention.

FIG. 10 shows a scanning procedure executed by the second preferred embodiment of the image processing system of the invention. In the present embodiment, one of a book-type document and a cut-sheet document is scanned by the scanner unit 1 to read image data from the document, and an image file is created from the image data in accordance with a defined file format.

The remote-scan image processing system of the present embodiment is essentially the same as that of the previous embodiment shown in FIG. 1, and a description thereof will be omitted. In the image processing system of the present embodiment, the image processing device 10, and the plurality of external computers (PC) 11, connected to the image processing device 10 through the local area network 12, are provided.

At a start of the scanning procedure of FIG. 10, an initial-menu screen is displayed on the display unit 3 of the image processing device 10 (S51). The CPU 2 receives a key-in destination and a key-in scan condition which are input by the operator from the operation unit 7 with the initial menu displayed (S52). The CPU 2 causes the operator to set a document on a contact glass of the scanner unit 1 or an automatic document feeder (ADF) of the scanner unit 1 (S53). In the present embodiment, the scanner unit 1 of the image processing device 10 is provided with the ADF. When the document to be scanned is a book-type document, it is set on the contact glass. When the document to be scanned is a cut-sheet document, it is set on the ADF. After the step S53 is performed, the CPU 2 causes the operator to depress the start button in the operation unit 7 to start the scanner unit 1 (S54).

After the step S54 is performed, the CPU 2 performs the image reading of the document by controlling the scanner unit 1 (S55). The CPU 2 stores the image data obtained at the step S55 and the selected destination received at the step S52 into the image memory 6 (S56).

The CPU 2 determines whether an end of the image reading is detected by the scanner unit 1 (S57). When the result at step S57 is negative, the control of the CPU 2 is transferred to the step S55.

When the result at step S57 is affirmative, the CPU 2 reads a defined file format from the ROM/RAM 8 (S58). The CPU 2 reads a set of the stored image data from the image memory 6 (S59). The CPU 2 creates an image file from the read image data in accordance with the read file format (S60). After the step S60 is performed, the scanning routine of FIG. 10 is finished. When an image file transmission procedure is further performed, the control of the CPU 2 is transferred to step S72 of the image file transmission procedure of FIG. 11.

FIG. 11 shows an image file transmission procedure executed by the image processing system of the present embodiment. In the present embodiment, an image file is transmitted from the image processing device 10 to the external computer 11 across the network 12.

At a start of the image file transmission procedure of FIG. 11, the CPU 2 of the image processing device 10 detects the storage of image files in the image memory 6 (S71). The CPU 2 sends a call to the external computer 11 across the network 12, which computer is designated as the destination of the image files to be transmitted (S72). After step S72 is performed, the CPU 2 causes the network I/F unit 5 to establish a connection of the image processing device 10 and the external computer 11 (S73).

After the connection of the image processing device 10 and the external computer 11 is established, the CPU 2 reads one of the stored image files from the image memory 6 (S74). The CPU 2 transmits the image file from the image processing device 10 to the external computer 11 across the network 12 (S74). The CPU 2 determines whether all the image files are transmitted to the external computer 11 (S76). When the result at step S76 is negative, the control of the CPU 2 is transferred to the step S74.

When the result at step S76 is affirmative, the CPU 2 controls the network I/F unit 5 to release the connection of the image processing device 10 and the external computer 11 (S77). After the step S77 is performed, the image file transmission procedure of FIG. 11 is finished.

Figure 12:
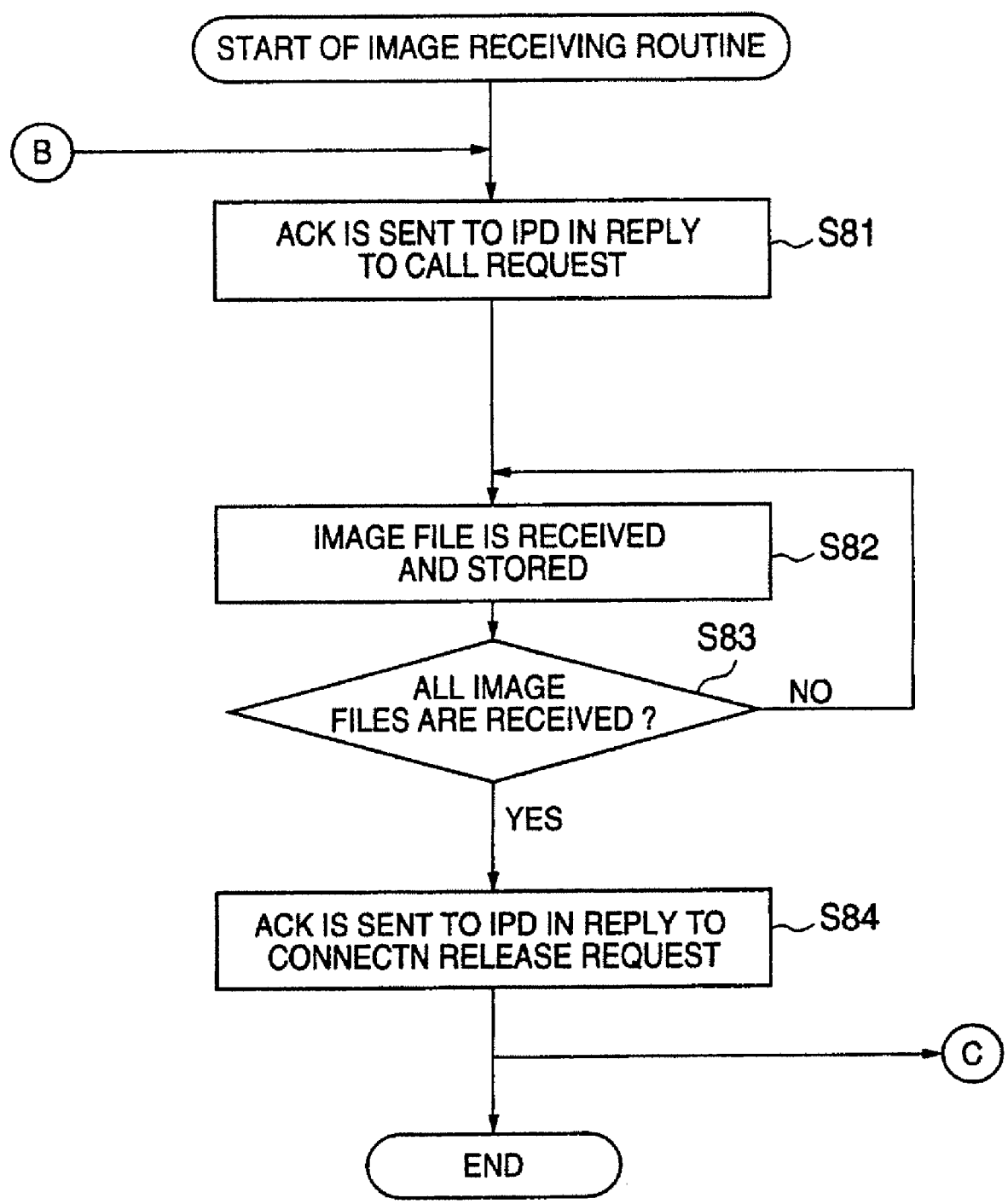
FIG. 12 is a flowchart for explaining an image file receiving procedure executed by the image processing system of the present embodiment.

FIG. 12 shows an image file receiving procedure executed by the image processing system of the present embodiment.

In the present embodiment, the external computer 11 receives an image file from the image processing device 10 across the network 12.

At a start of the image file receiving procedure of FIG. 12, the CPU of the external computer 11 (which will be called the controller) sends an acknowledge (ACK) signal to the image processing device 10 (will be called the IPD 10) in response to the call sent by the IPD 10 at the step S72 of FIG. 11 (S81).

After the connection of the IPD 10 and the external computer 11 is established, the controller receives the image file sent by the IPD 10 via the network 12 (S82). The controller determines whether all the image files sent by the IPD 10 are received at the external computer 11 (S83). When the result at step S83 is negative, the control of the controller is transferred to the step S82.

When the result at step S83 is affirmative, the controller sends an ACK signal to the IPD 10 in response to the releasing request sent by the IPD 10 so that the connection of the IPD 10 and the external computer 11 is released (S84). After the step S84 is performed, the image file receiving procedure of FIG. 12 is finished. When an image file retransmission procedure is further performed, the controller of the external computer 11 is transferred to step S91 of the image file retransmission procedure of FIG. 13.

Figure 13:
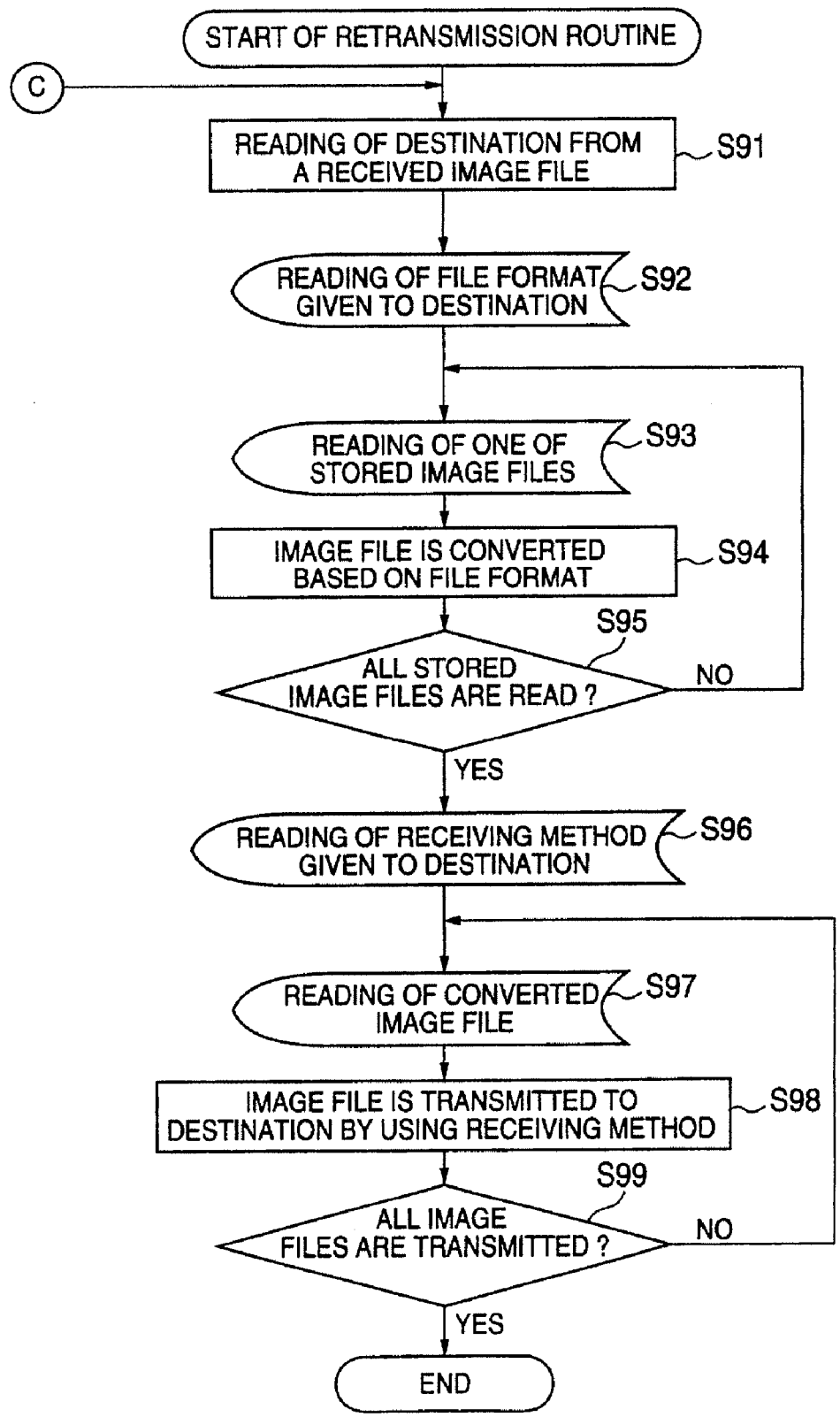
FIG. 13 is a flowchart for explaining an image file retransmission procedure executed by the image processing system of the present embodiment.

FIG. 13 shows an image file retransmission procedure executed by the image processing system of the present embodiment.

In the present embodiment, the external computer 11 transmits the image file, received from the image processing device 10, to another external computer among the plurality of external computers 11 across the network 12.

At a start of the image file retransmission procedure of FIG. 13, the controller of the external computer 11 reads the destination from the received image file, the destination indicating the other external computer among the plurality of external computers 11 in the network 12 to which the image file is transmitted (S91). The controller reads the file format given to the destination (S92). The controller reads one of the stored image files (S93). The controller creates an image file from the read image data in accordance with the read file format and stores the converted image file (S94).

After the step S94 is performed, the controller determines whether all the stored image files are read (S95). When the result at step S95 is negative, the control of the controller is transferred to the step S93.

When the result at step S95 is affirmative, the controller reads a receiving method given to the destination (S96). The controller reads the converted image file (S97). The controller transmits the converted image file to the destination (the other external computer among the plurality of external computers 11) across the network 12 (S98). The controller determines whether all the converted image files are retransmitted (S99). When the result at step S99 is negative, the control of the controller is transferred to the step S97. When the result at step S99 is affirmative, the image file retransmission procedure of FIG. 13 is finished.

Figure 14:
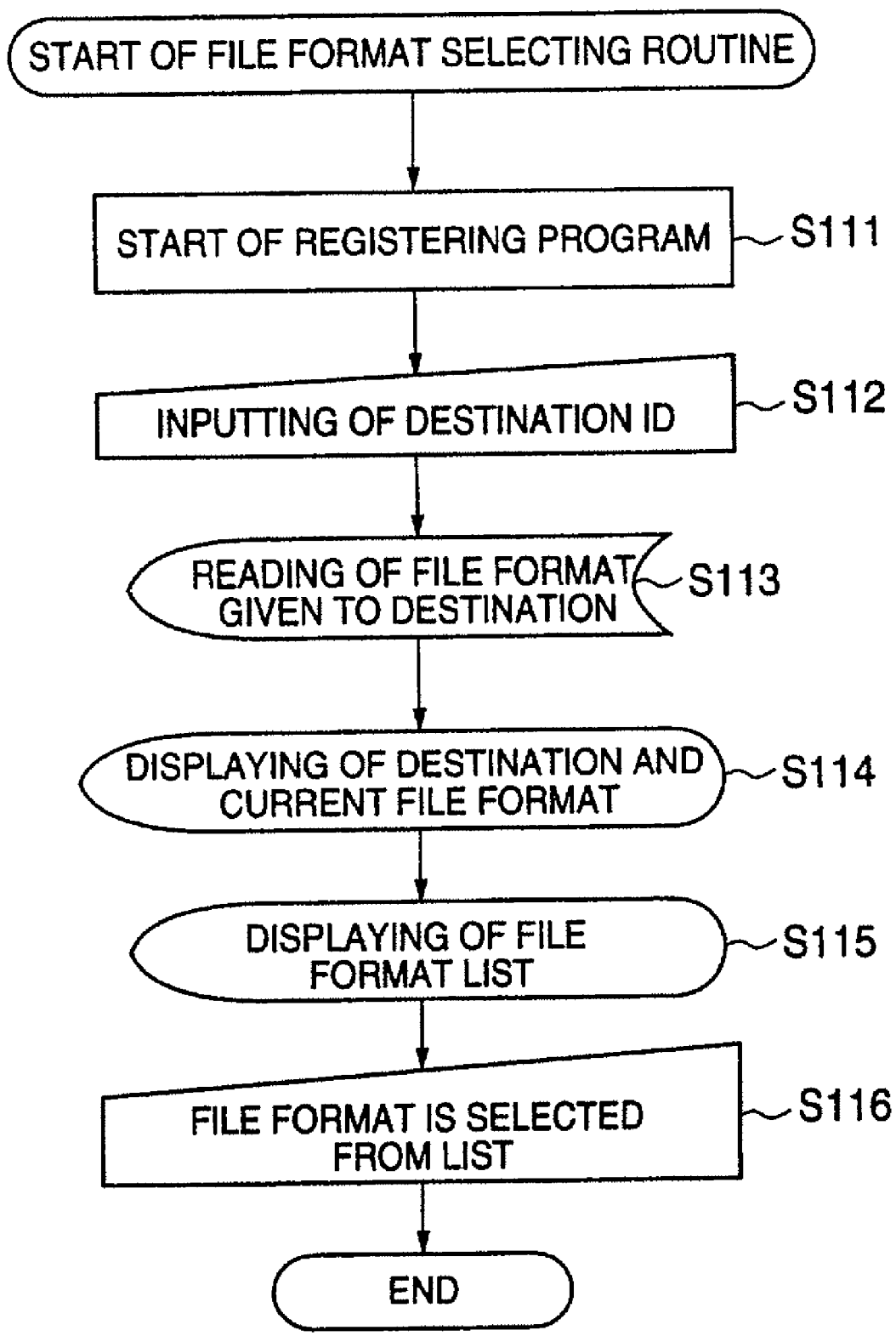
FIG. 14 is a flowchart for explaining a file format selection procedure executed by the image processing system of the present embodiment.

FIG. 14 shows a file format selecting procedure executed by the image processing system of the present embodiment.

Suppose that a file format is allocated to each of the plurality of external computers 11 on the network 12 and provides the method of creating an image file to be transmitted to the corresponding external computer as the destination. In the present embodiment, such file formats for the external computers 11 are stored in the form of a file format list, and the operator selects one of the stored file formats from the file format list before the transmission of an image file to the destination.

At a start of the file format selecting procedure of FIG. 14, the CPU 2 of the IPD 10 starts execution of the registering program from the ROM/RAM 8 (S111). In the step S111, the operator stores a file format list wherein the file formats are allocated to the respective external computers 11, into the ROM/RAM 8 by inputting the necessary key-in information from the operation unit 7.

After the step S111 is performed, the CPU 2 causes the operator to input a destination identifier that indicates one of the external computers in the network 12 (S112). The CPU 2 reads the file format currently given to the input destination, from the ROM/RAM 8 (S113). The CPU 2 displays the destination identifier and the file format (S114). The CPU 2 displays the file format list read from the ROM/RAM 8 (S115).

With the file format list displayed, the CPU 2 causes the operator to select one of the stored file formats from the file format list (S116). After the step S116 is performed, the file format selecting procedure of FIG. 14 is finished.

Figure 16:
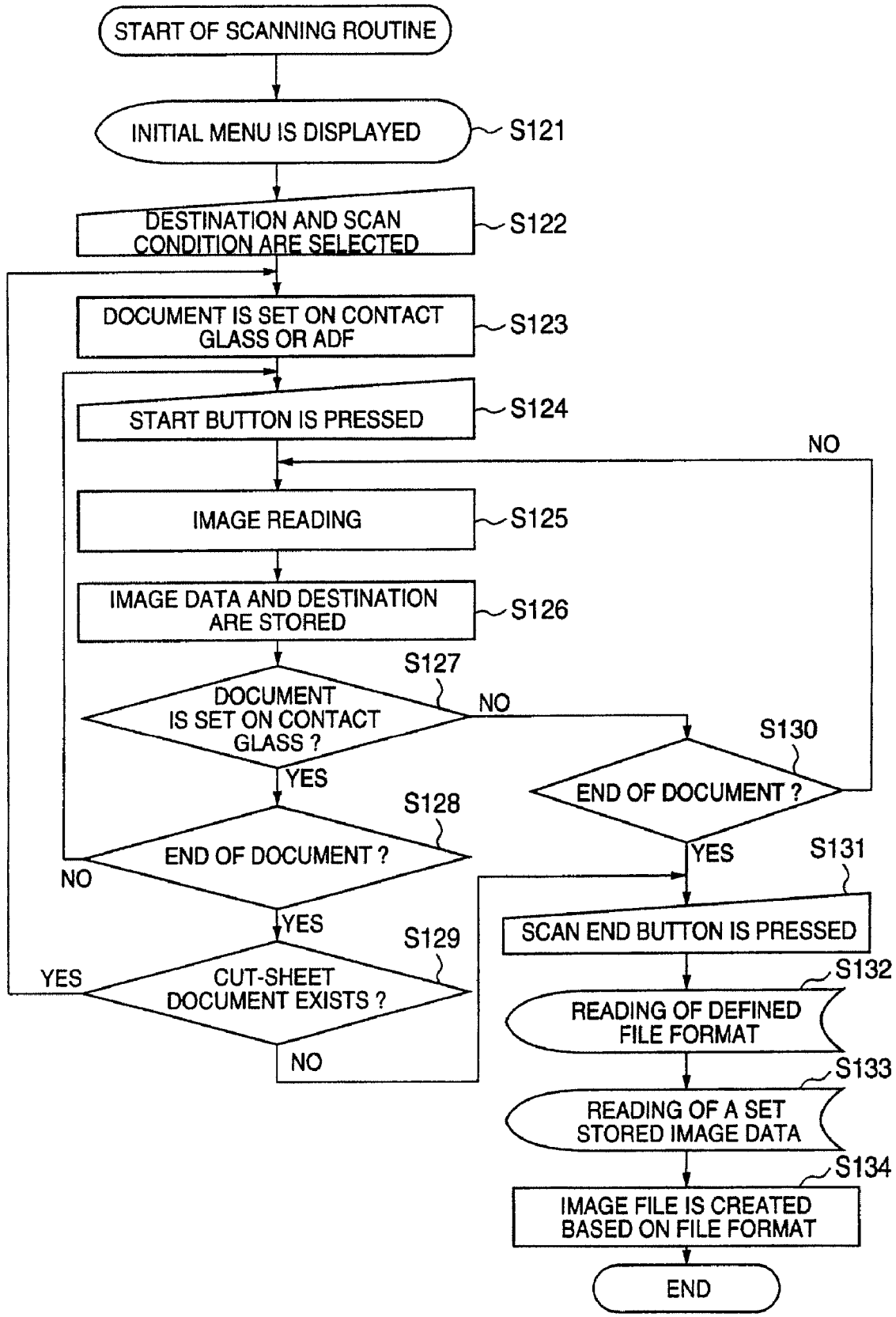
FIG. 16 is a flowchart for explaining a scanning procedure executed by the image processing system of the present embodiment.

Alternatively, the external computer 11 may start the execution of the file format selecting procedure which is the same as the procedure, shown in FIG. 16, including the steps S111 through S116. In such alternative embodiment, the operator on the external computer 11 may store the file format list wherein a desired file format is allocated to the operator's external computer 11 itself, into the ROM/RAM 8 of the image processing device 10, by inputting the necessary key-in information from the external computer 11 during the execution of the registering program.

Figure 15:
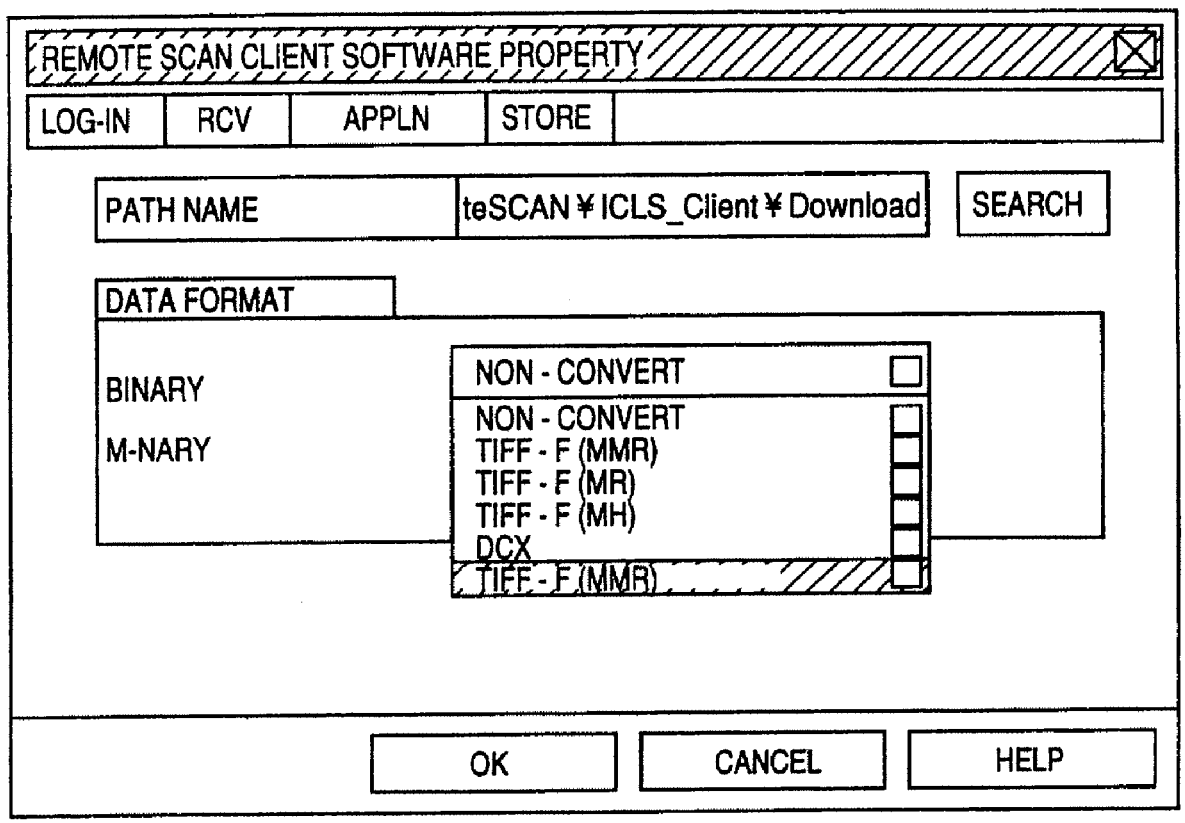
FIG. 15 is a diagram for explaining a file format storing screen displayed on the external computer.

FIG. 15 shows a file format storing screen displayed on the external computer in the alternative embodiment mentioned above.

For example, suppose that, in the image processing device 10, the file format of binary image files is set to TIFF-F (Tag Image File Format) that is proposed by Aldus Co., and the file format of M-nary image files is set to JPED format that is proposed by Joint Photographic Coding Experts Group. In the present embodiment, the external computer 11 starts the execution of the registering program, as shown in FIG. 15, and the file format that is the same as that of the file format list of the image processing device 10 is stored as the file format of a received image file at the external computer 11.

FIG. 16 shows a scanning procedure executed by the image processing system of the present embodiment. FIG. 17A, FIG. 17B, FIG. 17C and FIG. 17D show various operational screens displayed in the image processing device of the present embodiment during the scanning procedure of FIG. 16.

In the present embodiment, one of a book-type document and a cut-sheet document is scanned by the scanner unit 1 to obtain image data from the document, and an image file is created from the image data in accordance with a defined file format.

At a start of the scanning procedure of FIG. 16, the CPU 2 of the IPD 10 displays an initial menu (S121). With the initial menu displayed, the CPU 2 causes the operator to select the destination and the scan condition of an image file to be transmitted, from the initial menu (S122). The CPU 2 causes the operator to set a document on either the contact glass or the ADF of the scanner unit 1 (S123). When the document is a book-type document, the document is set on the contact glass. When the document is a cut-sheet document, the document is set on the ADF.

The CPU 2 causes the operator to depress the start button (S124). When the start button is depressed, the operational screen shown in FIG. 17A is displayed on the display unit 3. The CPU 2 controls the scanner unit 1 so that the image reading of the document is performed by the scanner unit 1 (S125). The CPU 2 stores the image data and the destination into the image memory 6 (S126).

After the step S126 is performed, the CPU 2 determines whether the document is set on the contact glass of the scanner unit 1 (S127). When the result at step S127 is affirmative, the operational screen shown in FIG. 17B is displayed on the display unit 3. The CPU 2 determines whether an end of the document is detected by the scanner unit 1 (S128). When the result at step S128 is negative, the control of the CPU 2 is transferred to the step S124.

When the result at step S128 is affirmative, the CPU 2 determines whether the cut-sheet document exists on the ADF (529). When the result at step S129 is affirmative, the control of the CPU 2 is transferred to the step S124. Otherwise the control of the CPU 2 is transferred to step S131, which will be described below.

When the result at step S127 is negative, the CPU 2 determines whether an end of the document on the ADF is detected (S130). When the result at step S130 is negative, the control of the CPU 2 is transferred to the step S125. Otherwise the CPU 2 causes the operator to depress the "scan end" button (S131).

When the "scan end" button is depressed, the CPU 2 reads the defined file format given to the destination, from the ROM/RAM 8 (S132). The CPU 2 reads a set of the stored image data from the image memory 6 (S133). The CPU 2 creates an image file from the read image data in accordance with the read file format (S134). After the step S134 is performed, the scanning procedure of FIG. 16 is finished.

Figure 18:
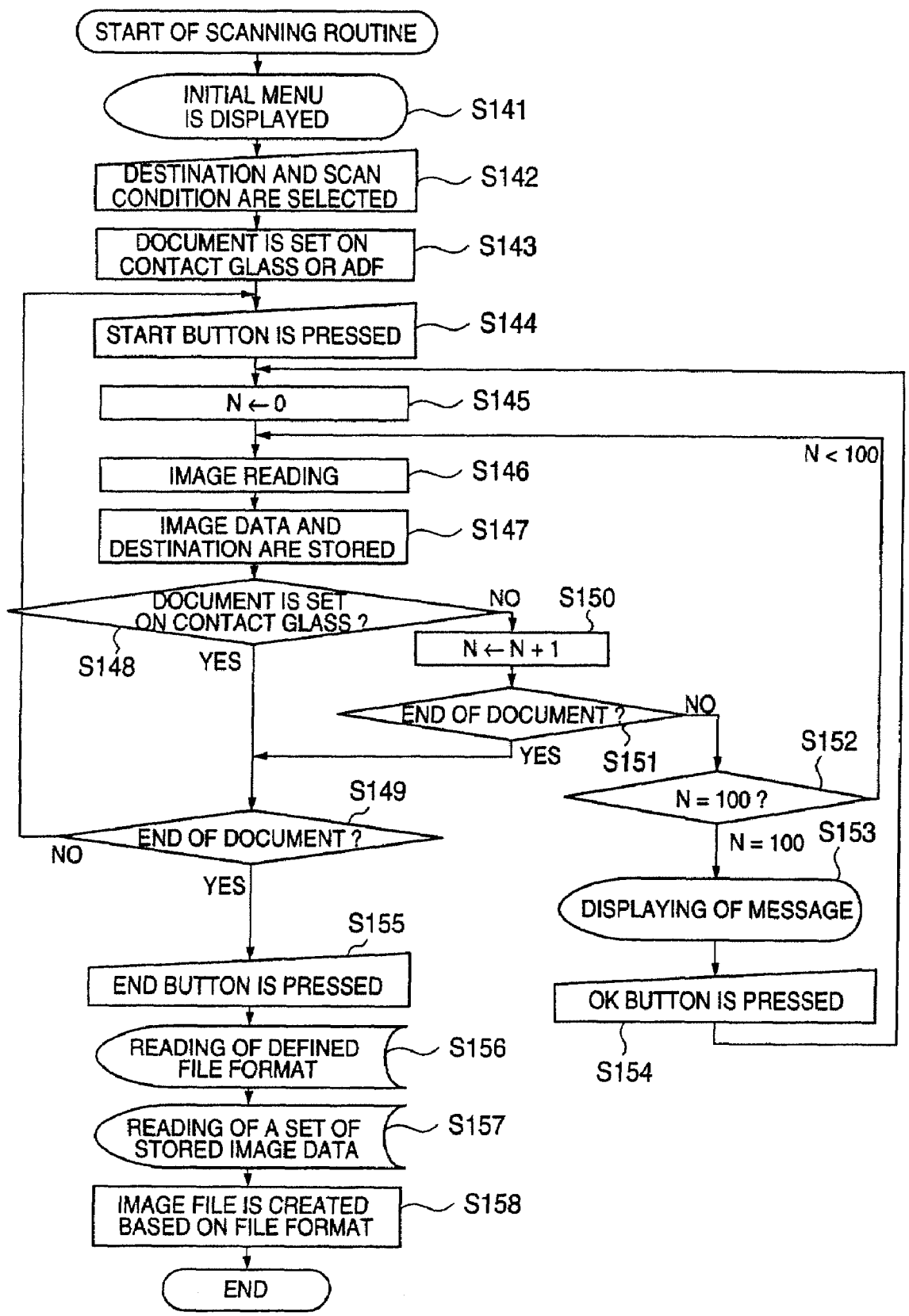
FIG. 18 is a flowchart for explaining a scanning procedure executed by the image processing system of the present embodiment.

FIG. 18 shows a scanning procedure executed by the image processing system of the present embodiment. FIG. 19A, FIG. 19B, FIG. 19C and FIG. 19D show various operational screens displayed in the image processing device of the present embodiment during the scanning procedure of FIG. 18.

In the present embodiment, an image file is created when the image data contained in the original document exceeds a maximum page of image data.

At a start of the scanning procedure of FIG. 18, the CPU 2 of the IPD 10 displays an initial menu (S141). With the initial menu displayed, the CPU 2 causes the operator to select the destination and the scan condition of an image file to be transmitted, from the initial menu (S142). The CPU 2 causes the operator to set a document on either the contact glass or the ADF of the scanner unit 1 (S143). When the document is a book-type document, the document is set on the contact glass. When the document is a cut-sheet document, the document is set on the ADF.

Figure 19A:
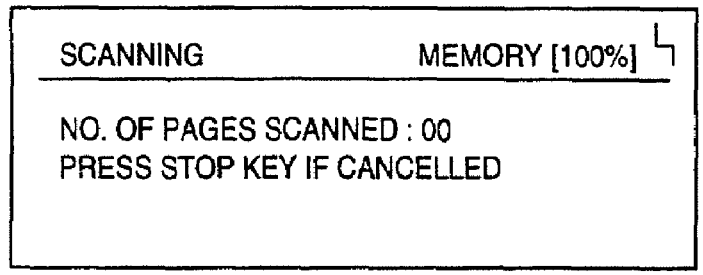
FIG. 19A, FIG. 19B, FIG. 19C and FIG. 19D are diagrams for explaining various operational screens displayed in the image processing device of the present embodiment.
Figure 19B:
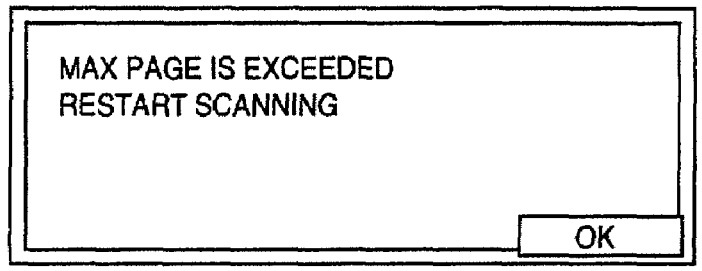

The CPU 2 causes the operator to depress the start button (S144). When the start button is depressed, the operational screen shown in FIG. 19A is displayed on the display unit 3. When the document is the book-type document, the counter "N", which indicates the number of pages scanned in the case of the cut-sheet document, is reset to zero (S145). The CPU 2 controls the scanner unit 1 so that the image reading of the document is performed by the scanner unit 1 (S146). The CPU 2 stores the image data and the destination into the image memory 6 (S147).

Figure 19C:
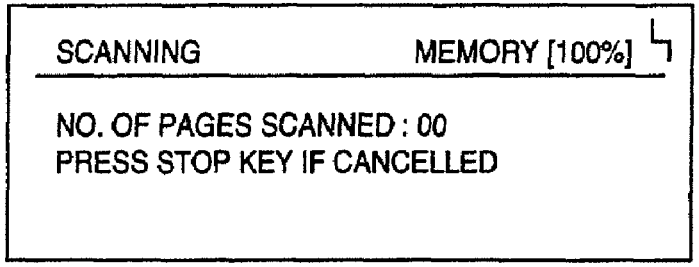

After the step S147 is performed, the CPU 2 determines whether the document is set on the contact glass of the scanner unit 1 (S148). When the result at step S148 is negative (the cut-sheet document exists on the ADF), the CPU 2 increments the counter "N" (S150). The CPU 2 determines whether an end of the cut-sheet document is detected by the scanner unit 1 (S151). When the result at step S151 is affirmative, the CPU 2 executes the next step S149, which will be described below. Otherwise the CPU 2 determines whether the count "N" reaches the maximum page (in this example, the maximum page=100) (S152). When the result at step S152 is affirmative (N=100), the CPU 2 displays the operational screen, shown in FIG. 19B, on the display unit 3 (S153). With the operational screen of FIG. 19B displayed, the CPU 2 causes the operator to set a next cut-sheet document on the ADF and depress the "OK" button of the operational screen, in order to restart the scanning of the document (S154). When the "OK" button is depressed, the operational screen shown in FIG. 19C is displayed on the display unit 3. After the step S154 is performed, the control of the CPU 2 is transferred to the step S145. Every time the counter "N" is incremented, the number of pages scanned in the operational screen is also incremented.

When the result at step S152 is negative (N<100), the control of the CPU 2 is transferred to the step S146.

Figure 19D:
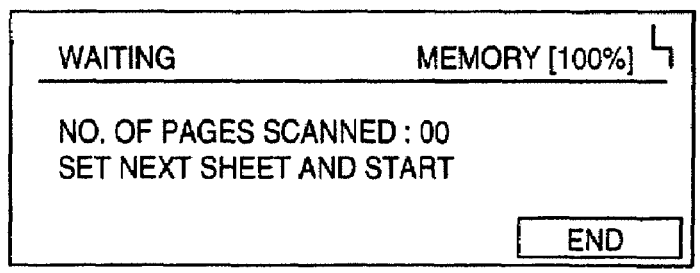

When the result at step S148 or the result at step S151 is affirmative, the operational screen shown in FIG. 19D is displayed on the display unit 3, and the CPU 2 determines whether the document does not exists on the scanner unit (S149). When the result at step S149 is negative, the control of the CPU 2 is transferred to the step S144. Otherwise the CPU 2 causes the operator to depress the "end" button of the operational screen of FIG. 19D (S515).

When the "end" button is depressed, the CPU 2 reads the defined file format given to the destination, from the ROM/RAM 8 (S156). The CPU 2 reads a set of the stored image data from the image memory 6 (S157). The CPU 2 creates an image file from the read image data in accordance with the read file format (S158). After the step S158 is performed, the scanning procedure of FIG. 18 is finished.

Next, a description will be given, with reference to FIG. 20 through FIG. 28, of a third preferred embodiment of the remote-scan image processing system of the invention.

In the present embodiment, the remote-scan image processing system is essentially the same as that of the previous embodiment shown in FIG. 1, and a description thereof will be omitted. In the image processing system of the present embodiment, the image processing device 10, and the plurality of external computers (PC) 11, connected to the image processing device 10 through the local area network 12, are provided.

In the image processing system of the present embodiment, which is described with reference to FIG. 20 through FIG. 22 and FIG. 1, image data are read from various documents by the scanner unit 1 of the image processing device 10 (which will be called the IPD 10), and the image data are stored in the image memory 6.

Figures 20, 21:
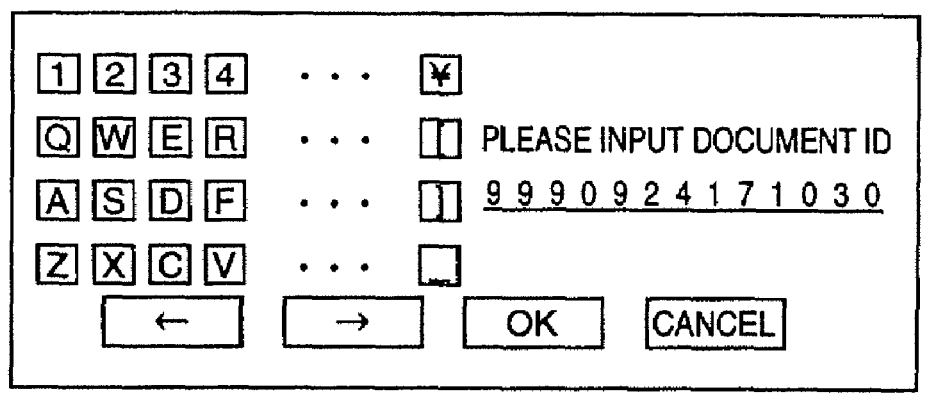
FIG. 20 is a diagram showing a document name input screen displayed in a third preferred embodiment of the image processing system of the invention.
FIG. 21 is a diagram for explaining a structure of image files stored in the image memory of the image processing device of the present embodiment.
Figure 22:
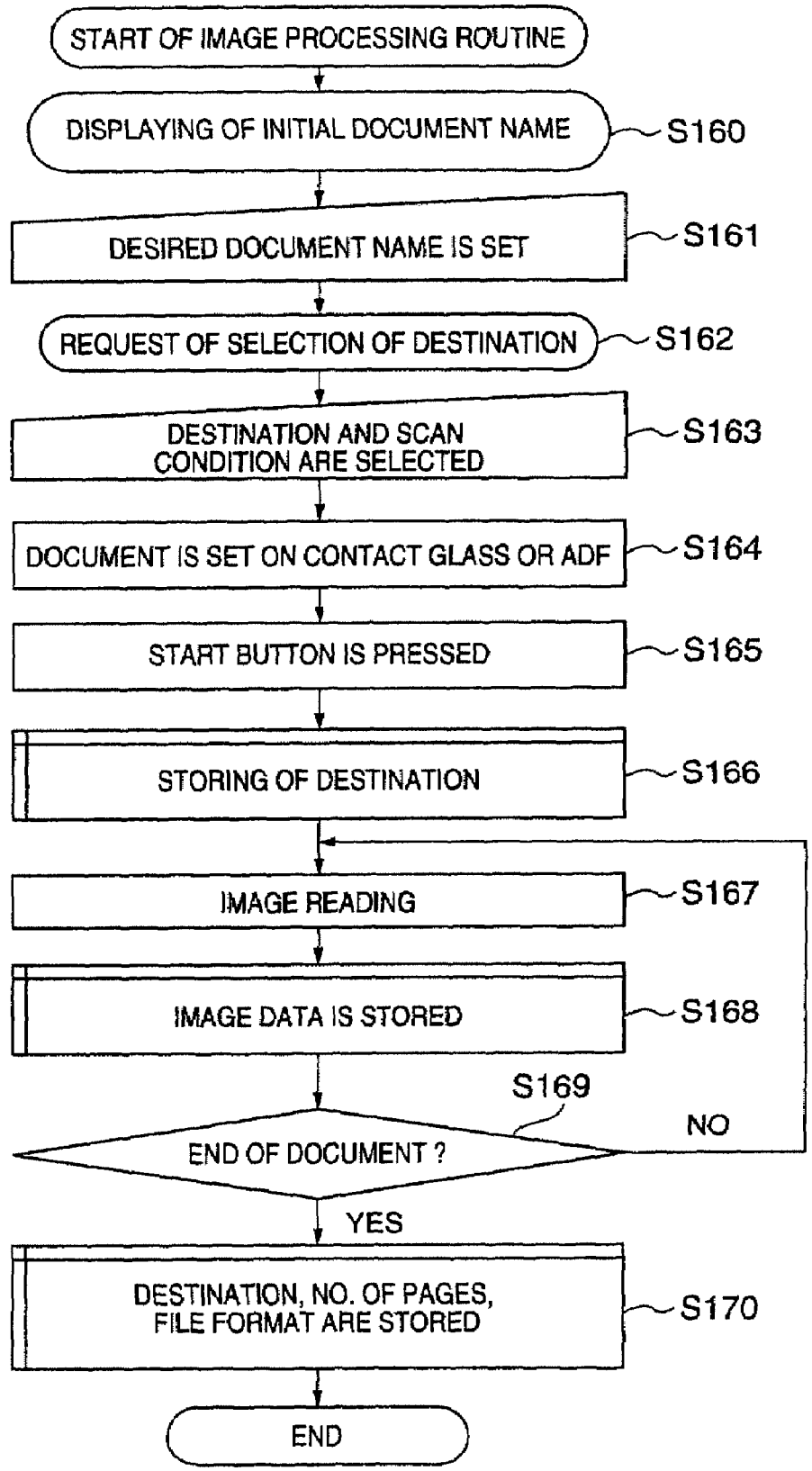
FIG. 22 is a flowchart for explaining an image processing procedure executed by the image processing system of the present embodiment.

FIG. 20 shows a document name input screen displayed on the display unit 3 and the operation unit 7 of the IPD 10 in the image processing system of the present embodiment. FIG. 21 shows a structure of image files stored in the image memory 6 of the IPD 10 of the present embodiment. FIG. 22 shows an image processing procedure executed by the CPU 2 of the IPD 10 in the image processing system of the present embodiment.

At a start of the image processing procedure of FIG. 22, the CPU 2 causes the display unit 3 to display an initial document name thereon (S160). The CPU 2 causes the operator on the operation unit 7 to set a desired document name of image data that will be read from a document and stored in the image memory 6 (S161).

For example, suppose that, as a result of step S161, the operator inputs the document name "19990924171030" from the operation unit 7 as shown in FIG. 20. The CPU 2 causes the display unit to display a request of selection of a desired destination of the image data on the display unit 3 (S162). The CPU 2 receives the destination and scan condition of the image data that are selected by the operator on the operation unit 7 (S163).

After the step S163 is performed, the CPU 2 causes the operator to set the document on the contact glass of the scanner unit 1 or the ADF of the scanner unit 1 (S164). When the document to be scanned is a book-type document, it is set on the contact glass. When the document to be scanned is a cut-sheet document, it is set on the ADF. After the step S164 is performed, the CPU 2 causes the operator to depress the start button in the operation unit 7 to start the scanner unit 1 (S165). The CPU 2 temporarily stores the selected destination, obtained at the step S163, into the ROM/RAM 8 (S166).

After the step S166 is performed, the CPU 2 performs the image reading of the document by controlling the scanner unit 1 (S167). The CPU 2 stores the image data, obtained at the step S167, into the image memory 6 (S168).

After the step S168 is performed, the CPU 2 determines whether an end of the document is detected by the scanner unit 1 (S169). When the result at step S169 is negative, the control of the CPU 2 is transferred to the step S167. Otherwise the CPU stores the selected destination, the number of pages of the image data and the file format of the image data into the image memory 6 together with the image data (S170). After the step S170 is performed, the image processing procedure of FIG. 22 is finished.

For example, suppose that, as a result of step S170, the image data containing 10 pages of images are stored into the image memory 6. In this case, as shown in FIG. 21, 10 pairs of image data file (e.g., "19990924171030-001.IMG") and image format file (e.g., "199909241710-001.PAGEINFO") for the ten-page images as well as a document information file (e.g., "19990924171030.DOCINFO") for the selected destination, the number of pages and the others are stored in the image memory 6. In this case, the total number of the files stored is 21.

In the image processing system of the present embodiment, which is described with reference to FIG. 23 through FIG. 26 and FIG. 1, the image data of the image memory 6 are transmitted from the image processing device 10 to one of the external computers 11 through the network 12.

Figure 26:
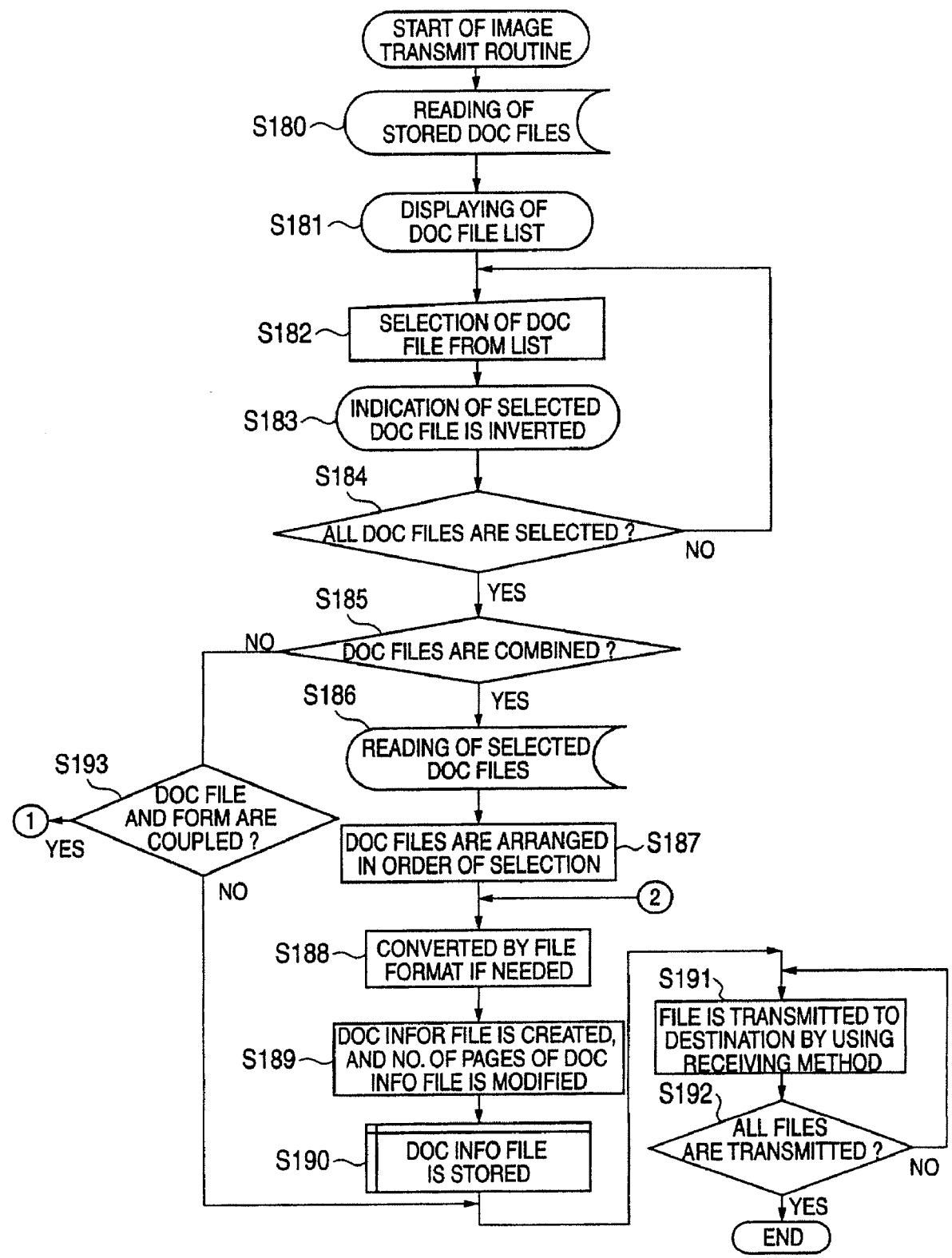
FIG. 26 is a flowchart for explaining an image file transmission procedure executed by the image processing system of the present embodiment.

FIG. 23 shows an operational screen (document file list) displayed on the display unit 3 and the operation unit 7 of the IPD 10 of the present embodiment. FIG. 24 shows operational screens (initial menu and destination list) displayed on the display unit 3 and the operation unit 7 of the IPD 10 of the present embodiment. FIG. 25 shows a structure of image files stored in the image memory 6 of the IPD 10 of the present embodiment. FIG. 26 shows an image file transmission procedure executed by the CPU 2 of the IPD 10 the image processing system of the present embodiment.

At a start of the image file transmission procedure of FIG. 26, the CPU 2 reads the image data of the stored document files from the image memory 6 (S180). The CPU 2 causes the display unit 3 to display a document list, containing a number of document names or identifiers of the document files of the image memory 6, based on the read image data as shown in FIG. 23 (S181). For example, in this case, the document list containing the file name "19990924171030" and others is displayed on the display unit 3.

With the document list displayed, the CPU 2 causes the operator to select a desired document file from the document list by inputting key-in information (S182). After the step S182 is performed, the CPU 2 causes the display unit 3 to invert the indication of the selected document file within the document file list (S183). After the step S183 is performed, the CPU 2 determines whether all the document files that should be transmitted are selected (S184).

When the result at step S184 is negative, the control of the CPU 2 is transferred to the step S182. Otherwise the CPU 2 determines whether the operator desires to combine the document files together prior to the image file transmission (S185).

When the result at step S185 is negative (or when the operator does not desire the file combination), the CPU 2 determines whether the operator desires to couple the document file and the form file prior to the image file transmission (S193). When the result at step S193 is negative, the operational screen (the initial menu), shown at the upper part of FIG. 24, is displayed on the display unit 3. As shown in FIG. 24, after the "DESTN" button in the initial menu is depressed by the operator, the CPU 2 causes the operational screen (the destination list), shown at the lower part of FIG. 24, to be displayed on the display unit 3. Then, the CPU 2 causes the operator to select a desired destination from among the plurality of destination identifiers of the destination list displayed on the display unit 3. In the example of FIG. 24, the destination identifiers of the destination list are department names of a certain company, and one of the department names in the destination list is selected as the destination by the operator. After the destination is selected by the operator, the CPU 2 causes the network I/F unit 5 to transmit one of the document files through the network 12 to the external computer 11, which is indicated by the selected destination, by using the receiving method (S191). After the step S191 is performed, the CPU 2 determines whether all the document files are transmitted to the destination (S192). When the result at step S192 is negative, the control of the CPU 2 is transferred to the step S191. Otherwise the image file transmission procedure of FIG. 26 is finished.

When the result at step S185 is affirmative (or when the operator desires the file combination), the CPU 2 reads the selected document files from the image memory 6 (S186). Suppose that, in this case, the operator desires to combine the document file "19990924171030" and the document file "DOC-A", indicated in the document file list of FIG. 23, prior to the image file transmission, and a combined document file is created from the two files. The CPU 2 causes the image processor 4 to arrange the selected document files in order of the selection (S187).

After the step S187 is performed, the CPU 2 causes the image processor 4 to convert, if needed, the selected document files according to the given file format (S188). The CPU 2 creates a combined document file from the selected document files, and modifies the number of pages included in the document information file of the selected document files by incrementing the number of pages (S189). FIG. 25 shows a structure of the image data files stored in the image memory 6 after the step S189 is performed. As shown in FIG. 25, the image data file "DOCUMENT-001.IMG" and the image format file "DOCUMENT-001.PAGEINFO" are newly included in the image memory 6. In this case, the number of pages included in the document information file is changed from 10 to 11.

After the step S189 is performed, the CPU 2 stores the modified document information file into the image memory 6 (S190). After the step S190 is performed, the control of the CPU 2 is transferred to the step S191, and the combined document file is transmitted at the step S191 through the network 12 to the external computer 11, which is indicated by the selected destination, by using the receiving method.

When the images of the selected document files have the same number of gray levels, it is possible to convert the selected document files into the multiple-page TIFF format files based on the corresponding document format files. In such a case, the document file, such as "990924171030.TIFF", is transmitted through the network 12 to the destination.

In the above-described embodiment, the file combining process is carried out by the CPU 2 of the image processing device 10. Alternatively, the document file combining process may be carried out by the external computer 11 instead of the CPU 2 of the image processing device 10. In such a case, the controller of the external computer 11 performs the steps S186 through S190 of the image file transmission procedure shown in FIG. 26.

When the result at step S193 is affirmative, the control of the CPU 2 is transferred to step S200 of FIG. 28, which will be described below.

In the image processing system of the present embodiment, which is described with reference to FIG. 27, FIG. 28 and FIG. 1, a combined image file, derived from the image data of the image memory 6, is transmitted from the image processing device 10 to one of the external computers 11 through the network 12.

Figure 27:
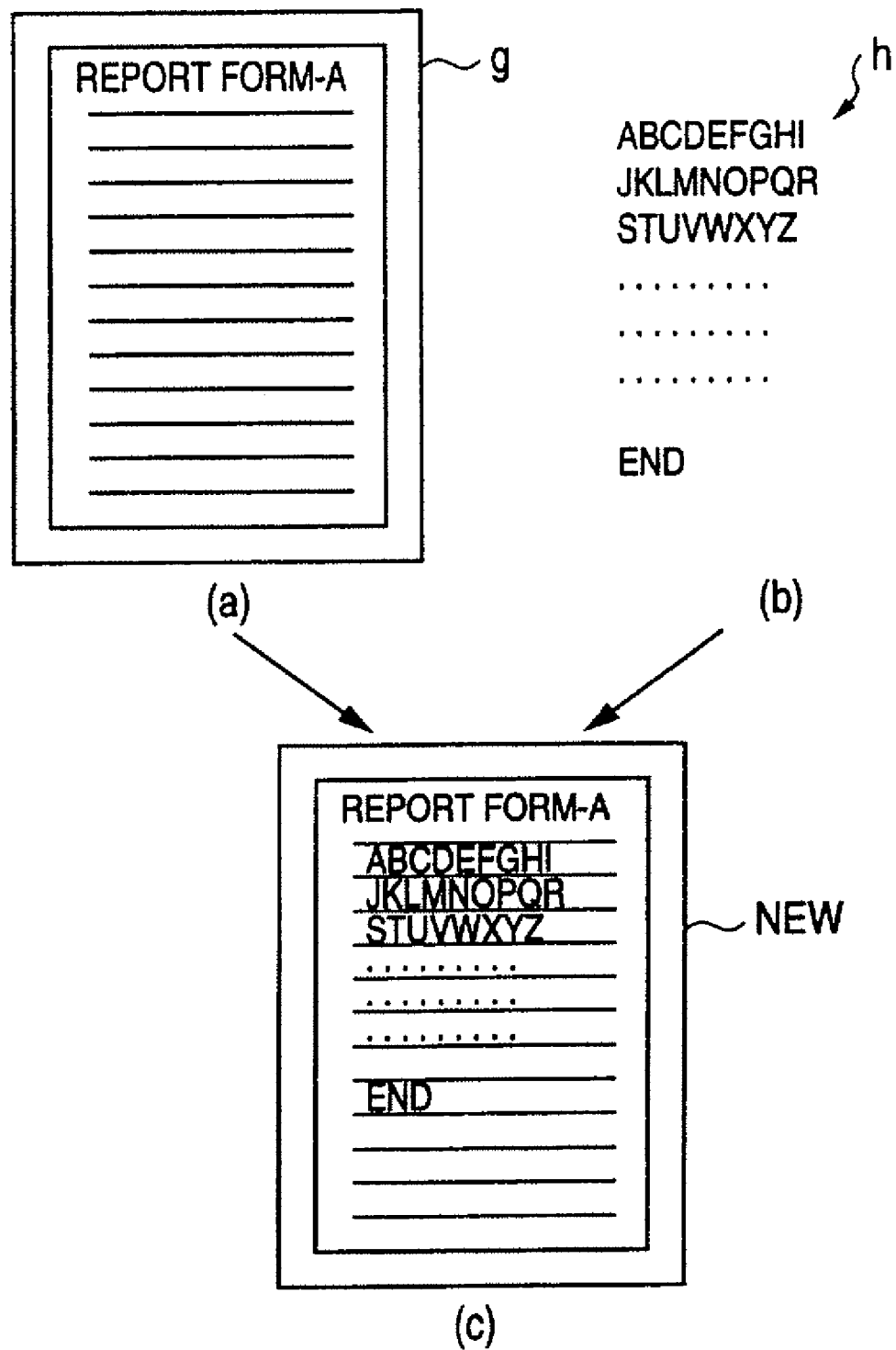
FIG. 27 is a diagram for explaining a file combining process.

FIG. 27 is a diagram for explaining a file combining process. FIG. 28 shows a file combining procedure executed by the image processing system of the present embodiment as a portion of the image file transmission procedure of FIG. 26.

Figure 28:
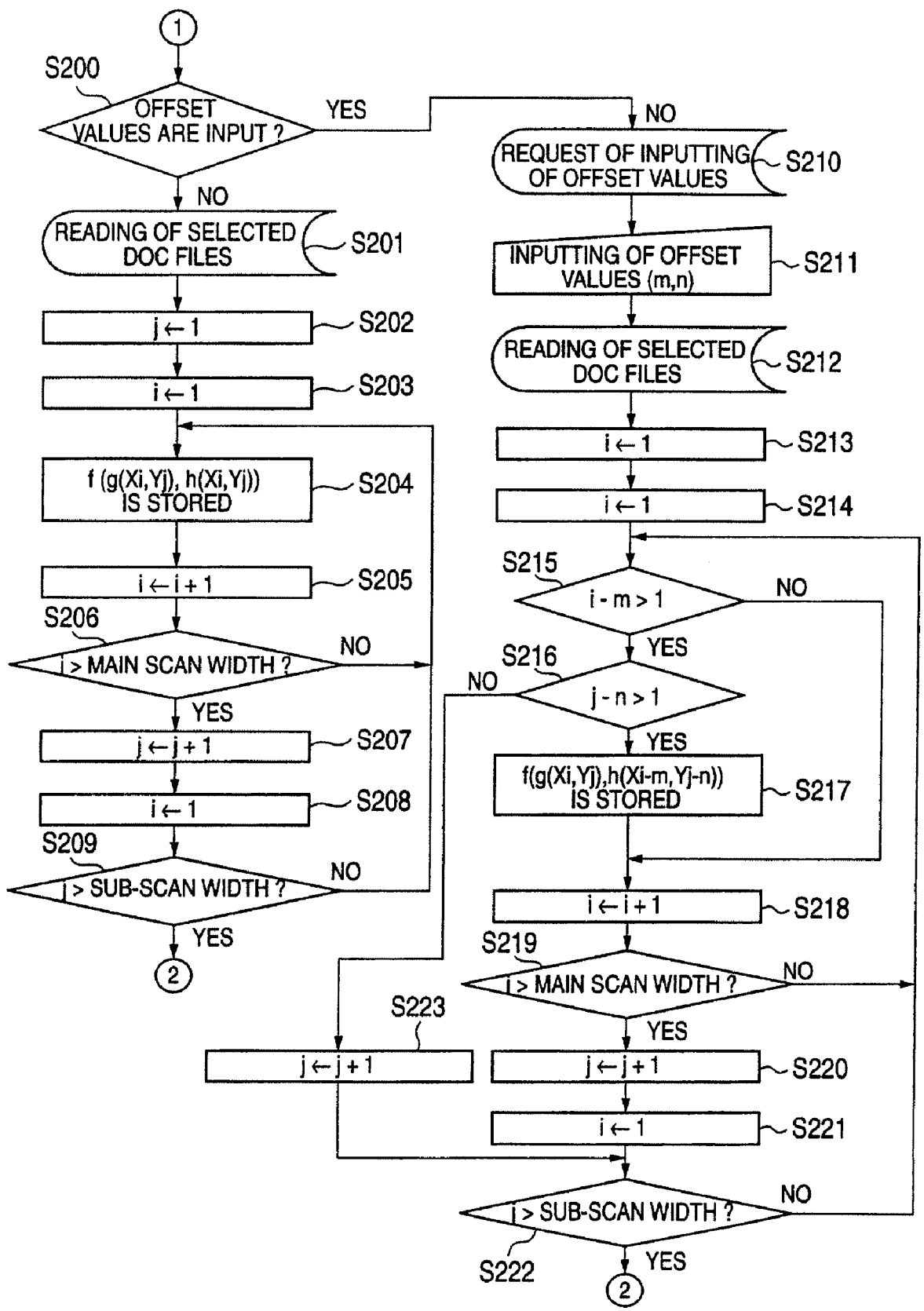
FIG. 28 is a flowchart for explaining a file combining procedure executed by the image processing system of the present embodiment.

As shown in FIG. 28, when the result at step S193 is affirmative (or when the operator desires to couple the document file and the form file prior to the image file transmission), the CPU 2 determines whether the operator desires to input offset values from the operation unit 7 when combining the two files (S200).

When combining the document file and the form file to create a combined image file, simple superimposing of one of the two files upon the other is inadequate for providing a proper page layout of the combined image file. The offset values, which indicate the differences in x and y position within the page between the document file and the form file, are needed to provide a proper page layout of the combined image file.

When the result at step S200 is negative, the CPU 2 performs the next step S201, which will be described below. When the result at step S200 is affirmative, the CPU 2 performs the next step S210, which will be described later.

When the operator does not desire to input the offset values (or when the result at step S200 is negative), the CPU 2 reads the selected document files that are to be combined, from the image memory 6 (S201). Suppose that, in the present embodiment, the form file "g", indicated by (a) in FIG. 27, contains picture elements "g(Xi, Yj)", the document file "h", indicated by (b) in FIG. 27, contains picture elements "h(Xi, Yj)", and the combined image file "NEW", indicated by (c) in FIG. 27, contains picture elements "NEW(Xi, Yj)". The image combination of the two files is achieved by performing OR operations of the two image data, as in the following equation:

$$NEW(Xi, Yj) = f(g(Xi, Yj), h(Xi, Yj)) \quad (1)$$

where Xi indicates the i-th picture element in the main scanning direction, and Yj indicates the j-th picture element in the sub-scanning direction.

It is assumed that the conditions $1 \leq i \leq$ main scan width (the total number of picture elements of the file in the main scanning direction) and $1 \leq j \leq$ sub-scan width (the total number of picture elements of the file in the sub-scanning direction) are satisfied.

After the step S201 is performed, the CPU 2 sets the counter "i" to 1 (S202), and sets the counter "j" to 1 (S203).

The CPU 2 calculates the results of OR operations of the two image data, and stores the values of f (g(Xi, Yj), h(Xi, Yj)) in the ROM/RAM 8 (S204). After the step S204 is performed, the CPU 2 increments the counter "i" (S205).

After the step S205 is performed, the CPU 2 determines whether the value of the counter "i" exceeds the main scan width (S206). When the result at step S206 is negative, the control of the CPU 2 is transferred to the step S204. Otherwise the CPU 2 increments the counter "j" (S207), and sets the counter "i" to 1 (S208).

After the step S208 is performed, the CPU 2 determines whether the value of the counter "j" exceeds the sub-scan width (S209). When the result at step S209 is negative, the control of the CPU 2 is transferred to the step S204. Otherwise the combined image file is created from the two files, and the control of the CPU 2 is transferred to the step S188 shown in FIG. 26. As described earlier, the image file transmission procedure is carried out with respect to the combined image file.

On the other hand, when the result at step S200 is affirmative (or when the operator desires to input the offset values), the CPU 2 causes the display unit 3 to display a request of inputting of the offset values (m, n) (S210). After the step S210 is performed, the CPU 2 causes the operator to input the offset values (m, n) from the operation unit 7 (S211).

After the step S211 is performed, the CPU 2 reads the selected document files that are to be combined, from the image memory 6 (S212). Suppose that, in the present embodiment, the form file "g", indicated by (a) in FIG. 27, contains picture elements "g(Xi, Yj)", the document file "h", indicated by (b) in FIG. 27, contains picture elements "h(Xi-m, Yj-n)", and the combined image file "NEW", indicated by (c) in FIG. 27, contains picture elements "NEW(Xi, Yj)". The image combination of the two files with the offset is achieved by performing OR operations of the two image data with the offset values considered, as in the following equation:

$$NEW(Xi, Yj) = f(g(Xi, Yj), h(Xi-m, Yj-n)) \quad (2)$$

where Xi indicates the i-th picture element in the main scanning direction, and Yj indicates the j-th picture element in the sub-scanning direction.

It is assumed that the conditions $1 \leq i-m \leq$ the main scan width (the total number of picture elements of the file in the main scanning direction) and $1 \leq j-n \leq$ the sub-scan width (the total number of picture elements of the file in the sub-scanning direction) are satisfied.

After the step S212 is performed, the CPU 2 sets the counter "i" to 1 (S213), and sets the counter "j" to 1 (S214). The CPU 2 determines whether the value of "i-m" is larger than 1 (S215). When the result at step S215 is affirmative, the CPU 2 determines whether the value of "j-n" is larger than 1 (S216). Otherwise the control of the CPU 2 is transferred to step S218, which will be described later.

When the result at step S216 is affirmative, the CPU 2 calculates the results of OR operations of the two image data with the offset values considered, and stores the values of f (g(Xi, Yj), h(Xi-m, Yj-n)) into the ROM/RAM 8 (S217). After the step S217 is performed, the CPU 2 increments the counter "i" (S218).

After the step S218 is performed, the CPU 2 determines whether the value of the counter "i" exceeds the main scan width (S219). When the result at step S219 is negative, the control of the CPU 2 is transferred to the step S215. Otherwise the CPU 2 increments the counter "j" (S220), and sets the counter "i" to 1 (S221).

After the step S221 is performed, the CPU 2 determines whether the value of the counter "j" exceeds the sub-scan width (S222). When the result at step S222 is negative, the control of the CPU 2 is transferred to the step S215. Otherwise the combined image file is created from the two files with the offset values considered, and the control of the CPU 2 is transferred to the step S188 shown in FIG. 26. As described earlier, the image file transmission procedure is carried out with respect to the combined image file.

When the result at step S216 is negative, the CPU 2 increments the counter "j" (S223). After the step S223 is performed, the control of the CPU 2 is transferred to the step S222.

In the above-described embodiment, both the file combining process and the combined image file transmission process are carried out by the CPU 2 of the image processing device 10. Alternatively, the file combining process may be carried out by the external computer 11, instead of the CPU 2 of the image processing device 10. In such alternative embodiment, after the combined image file, transmitted by the image processing device 10, is received at the external computer 11, the controller of the external computer 11 performs the steps S200 through S223 of the file combining procedure of FIG. 28, and performs only the steps S188 through S190 of the procedure of FIG. 26.

Accordingly, the image processing device, method and system of the present embodiment are effective in enabling the receiver of the image file to immediately overview the contents of the image file or the like, so as to increase the convenience of the remote scanning capability to the users. The image processing device, method and system of the present embodiment are effective in enabling the receiver's computer to perform various post-processing procedures of the image file after the reception of the image file, in order to increase the convenience of the remote scanning capability to the users.

Next, a description will be given, with reference to FIG. 29 through FIG. 36, of a fourth preferred embodiment of the remote-scan image processing system of the invention.

Figure 29:
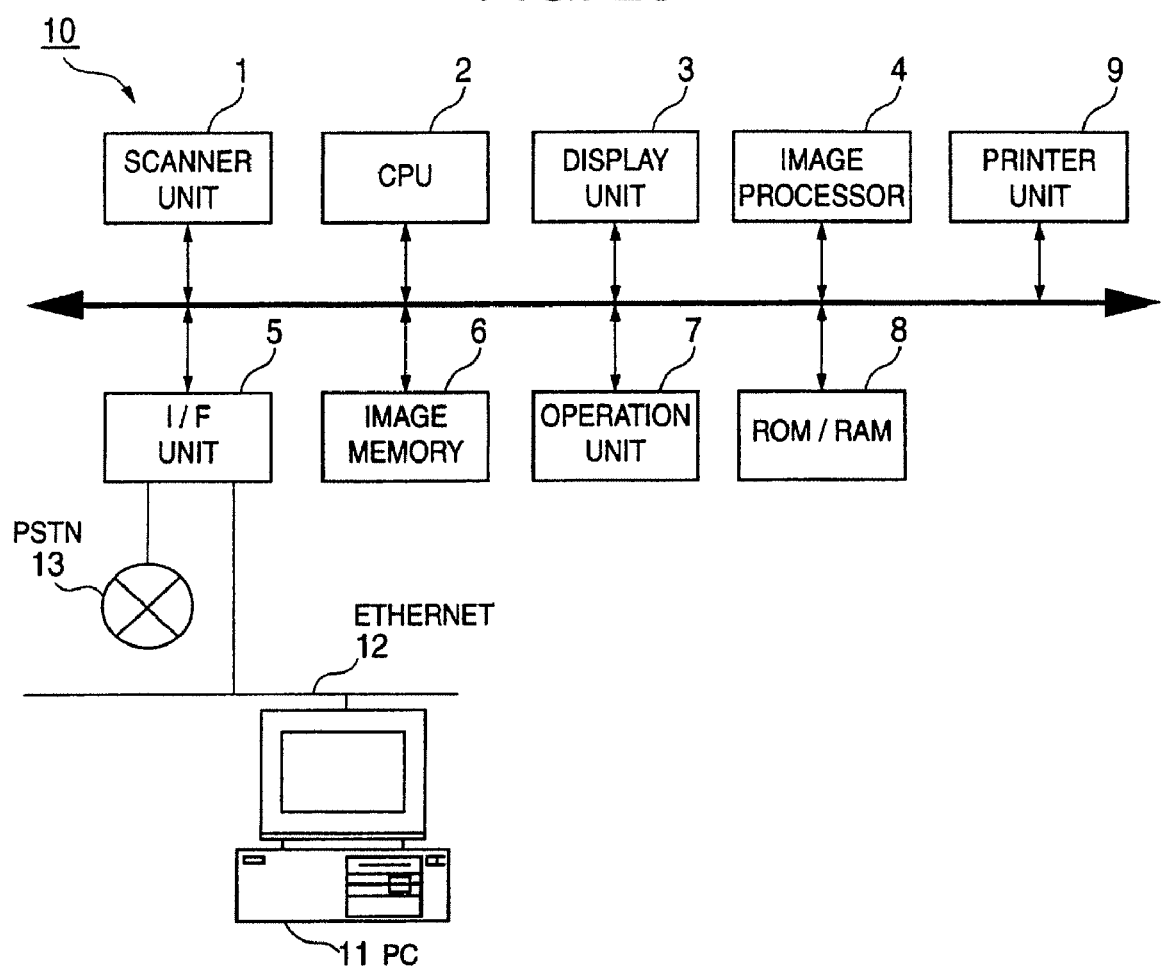
FIG. 29 is a block diagram of a fourth preferred embodiment of the image processing system of the invention.

FIG. 29 shows the fourth preferred embodiment of the remote-scan image processing system of the invention. As shown in FIG. 29, the remote-scan image processing system of the present embodiment is essentially the same as that of the previous embodiment shown in FIG. 1 except that the image processing device 10 of the present embodiment further includes a printer unit 9 connected to the local bus. In the image processing system of the present embodiment, the image processing device 10, and the plurality of external computers (PC) 11, connected to the image processing device 10 through the local area network 12, are provided. In FIG. 29, the elements that are essentially the same corresponding elements in FIG. 1 are designated by the same reference numerals, and a description thereof will be omitted.

In the image processing system shown in FIG. 29, image data are read from various documents by the scanner unit 1 of the image processing device 10 (which will be called the IPD 10), and the image data are stored, together with personnel information (which includes at least a personnel identifier, a pertinent department and so on) that is related to the operator who stores the image data by optically reading the documents, into the image memory 6. Further, in the image processing system of the present embodiment, the image data are transmitted, together with the stored personnel information, from the IPD 10 to one of the external computers 11 through the network 12. A number of personnel information items allocated for a number of personnel of the company are stored in a personnel database DB (which may be provided in the ROM/RAM 8 or elsewhere on the local bus), and the personnel database is connected to the IPD 10 via the local bus.

Further, in the image processing system shown in FIG. 29, the IPD 10 is provided with the printer unit 9, and, by printing the images of document files by using the printer unit 9, the operator can easily observe the offset values needed when combining the document files.

In the image processing system of the present embodiment, which is described with reference to FIG. 29 through FIG. 31B, image data are read from various documents by the scanner unit 1 of the IPD 10, and the image data are stored in the image memory 6.

Figure 30:
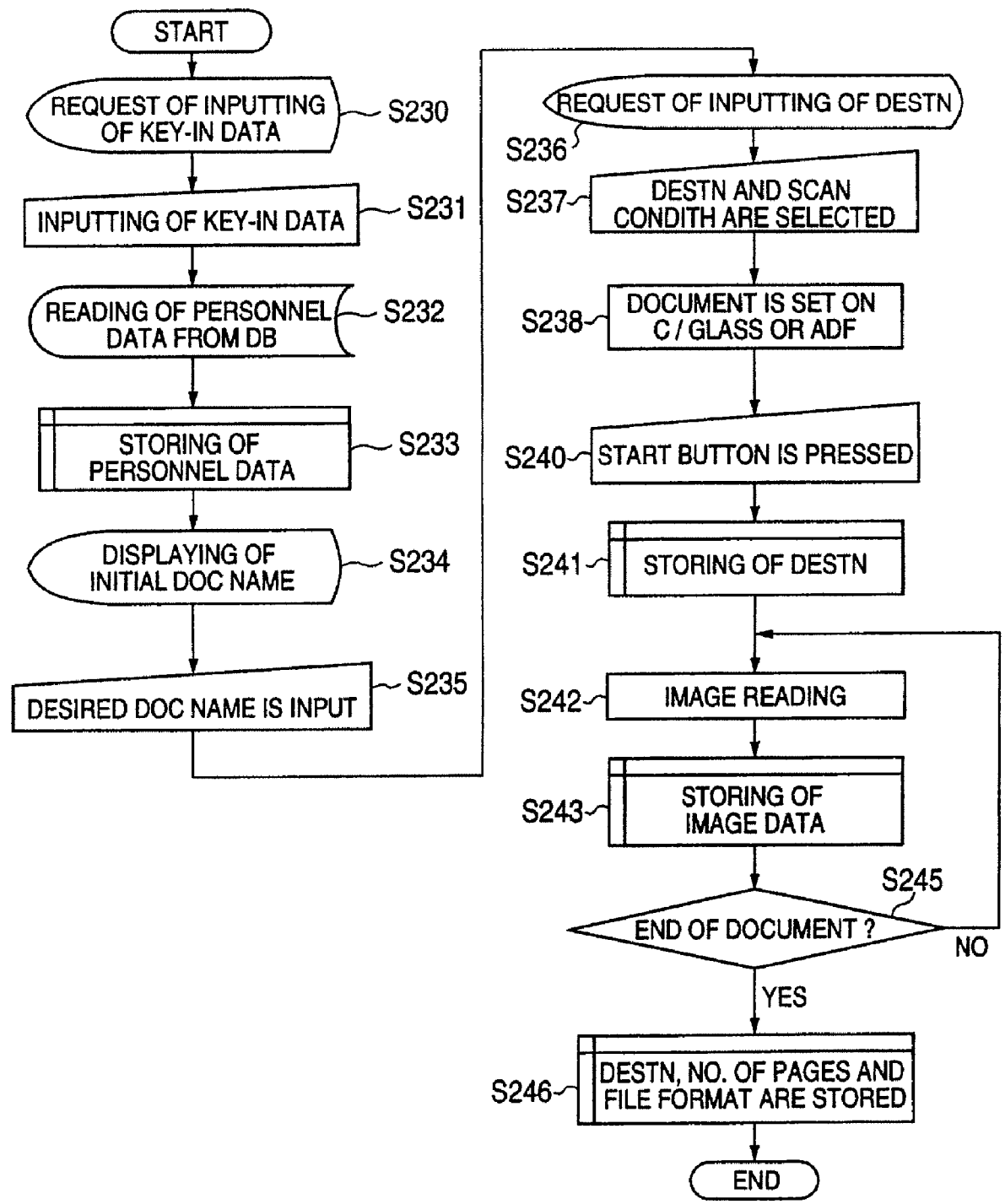
FIG. 30 is a flowchart for explaining an image data storage procedure executed by the image processing system of the present embodiment.

FIG. 30 shows an image data storage procedure that is executed by the CPU 2 of the IPD 10 in the image processing system of the present embodiment. FIG. 31A and FIG. 31B show input screens that are displayed on the display unit 3 and the operation unit 7 of the IPD 10 when the procedure of FIG. 30 is performed.

At a start of the image data storage procedure of FIG. 30, the CPU 2 causes the display unit 3 to display a request of inputting of a personnel identifier of the operator thereon as shown in FIG. 31A (S230). The CPU 2 receives the personnel identifier that is input by the operator from the operation unit 7 (S231). The CPU 2 reads the relevant personnel information (including the personnel name, the pertinent department and so on) from the personnel database based on the received personnel identifier (S232). After the step S232 is performed, the CPU 2 temporarily stores the personnel information in a memory of the CPU 2 or the ROM/RAM 8 (S233).

After the step S233 is performed, the CPU 2 causes the display unit 3 to display an initial document name thereon (S234). The CPU 2 causes the operator on the operation unit 7 to set a desired document name of image data that will be read from a document and stored in the image memory 6 as shown in FIG. 31B (S235).

For example, suppose that, as a result of step S235, the operator inputs the document name "XYZ" from the operation unit 7 as shown in FIG. 31B. The CPU 2 causes the display unit 3 to display a request of selection of a desired destination of the image data on the display unit 3 (S236). The CPU 2 receives the destination and scan condition of the image data that are selected by the operator on the operation unit 7 (S237).

After the step S237 is performed, the CPU 2 causes the operator to set the document on the contact glass of the scanner unit 1 or the ADF of the scanner unit 1 (S238). When the document to be scanned is a book-type document, it is set on the contact glass. When the document to be scanned is a cut-sheet document, it is set on the ADF. After the step S238 is performed, the CPU 2 causes the operator to depress the start button in the operation unit 7 to start the scanner unit 1 (S240). The CPU 2 temporarily stores the selected destination into the ROM/RAM 8 (S241).

After the step S241 is performed, the CPU 2 performs the image reading of the document by controlling the scanner unit 1 (S242). The CPU 2 stores the image data, obtained at the step S242, into the image memory 6 (S243).

After the step S243 is performed, the CPU 2 determines whether an end of the document is detected by the scanner unit 1 (S245). When the result at step S245 is negative, the control of the CPU 2 is transferred to the step S242. Otherwise the CPU stores the selected destination, the number of pages of the image data and the file format of the image data, as well as the personnel information obtained at the step S233, into the image memory 6 together with the image data (S246). After the step S246 is performed, the image processing procedure of FIG. 30 is finished.

Similar to the previous embodiments, the stored image data of the image memory 6 are transmitted from the IPD 10 through the network 12 to one of the external computers 11 that is designated as the destination.

In the present embodiment, the structure of files stored in the image memory 6 is the same as that of the previous embodiment shown in FIG. 21. The personnel information described above is contained in the document information file (e.g., "19990924171030.DOCINFO" shown in FIG. 21) that is stored in the image memory 6 of the present embodiment.

In the image processing system of the present embodiment, which is described with reference to FIG. 32 through FIG. 34D, a combined image file is created from plural document files of the image memory 6 of the IPD 10, and the combined image file is transmitted from the IPD 10 to one of the external computers 11 through the network 12.

Figure 32:
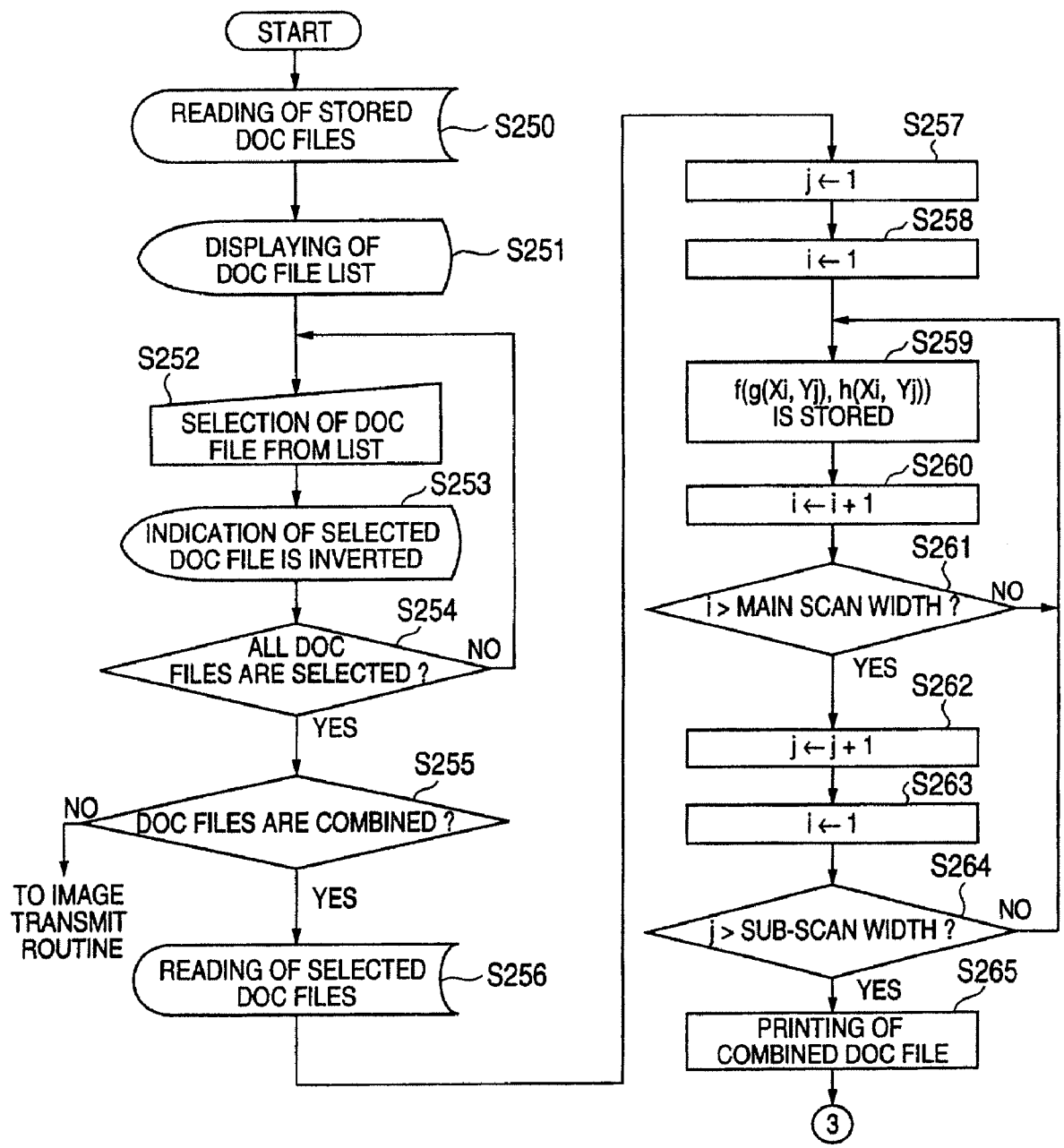
FIG. 32 is a flowchart for explaining a portion of a file combining procedure executed by the image processing system of the present embodiment.
Figure 33:
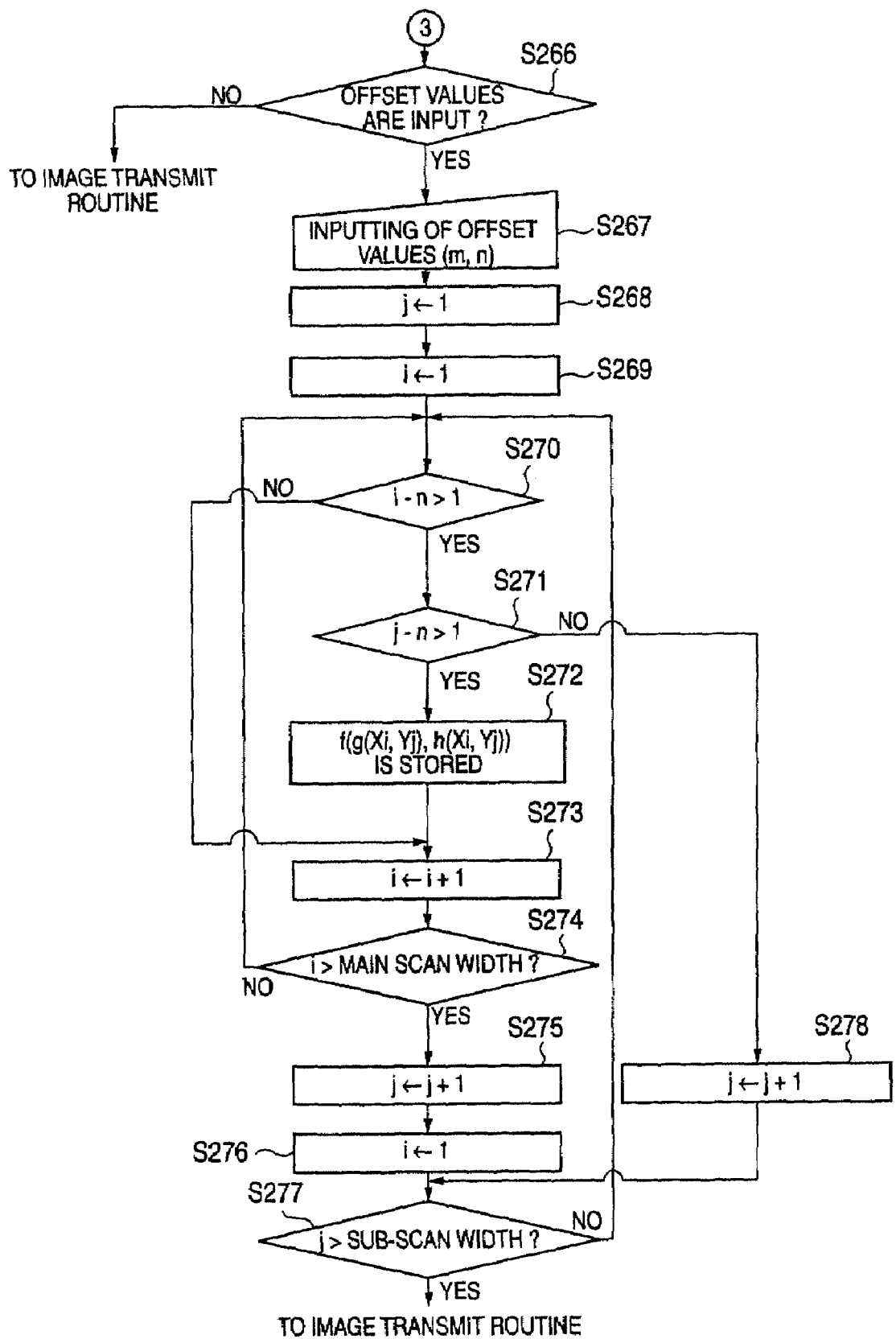
FIG. 33 is a flowchart for explaining another portion of the file combining procedure executed by the image processing system of the present embodiment.

FIG. 32 shows a first portion of a file combining procedure executed by the CPU 2 of the IPD 10 in the image processing system of the present embodiment. FIG. 33 shows a second portion of the file combining procedure executed by the CPU 2 of the IPD 10 in the image processing system of the present embodiment. FIG. 34A, FIG. 34B, FIG. 34C and FIG. 34D show an example of the file combining process in which plural document files are combined together.

The file combining procedure of FIG. 32, which uses the printing of a combined image file, allows the operator to easily determine the offset values that are needed to provide a proper page layout of the combined image file. The file combining procedure of FIG. 33, which uses the offset values input by the operator as the result of the first-portion file combining procedure of FIG. 32, allows accurate page layout of the combined mage file.

At a start of the file combining procedure of FIG. 32, the CPU 2 reads the image data of the stored document files from the image memory 6 (S250). The CPU 2 causes the display unit 3 to display a document list, containing a number of document names or identifiers of the document files of the image memory 6, based on the read image data (S251).

With the document list displayed, the CPU 2 causes the operator to select a desired document file from the document list by inputting key-in information (S252). After the step S252 is performed, the CPU 2 causes the display unit 3 to invert the indication of the selected document file within the document file list (S253). After the step S253 is performed, the CPU 2 determines whether all the document files that should be transmitted are selected (S254).

When the result at step S254 is negative, the control of the CPU 2 is transferred to the step S252. Otherwise the CPU 2 determines whether the operator desires to combine the document files prior to the image file transmission (S255).

When the result at step S255 is negative (or when the operator does not desire the file combination), the control of the CPU 2 is transferred to an image file transmission process that is the same as the steps S191 and S192 in the procedure shown in FIG. 26.

When the result at step S255 is affirmative (or when the operator desires the file combination), the CPU 2 reads the selected document files that are to be combined, from the image memory 6 (S256). Suppose that, in the present embodiment, the form file "g", shown in FIG. 34A, contains picture elements "g($X_i$, $Y_j$)", the document file "h", shown in FIG. 34B, contains picture elements "h($X_i$, $Y_j$)", and a combined image file without considering the offset values, shown in FIG. 34C, contains picture elements "f($X_i$, $Y_j$)". The image combination of the two files is achieved by performing OR operations of the two image data. It is assumed that the conditions $1 \leq i \leq$ the main scan width, and $1 \leq j \leq$ the sub-scan width are satisfied.

After the step S256 is performed, the CPU 2 sets the counter "i" to 1 (S257), and sets the counter "j" to 1 (S258). The CPU 2 calculates the results of OR operations of the two image data, and stores the values of f(g($X_i$, $Y_j$), h($X_i$, $Y_j$)) into the ROM/RAM 8 (S259). After the step S259 is performed, the CPU 2 increments the counter "i" (S260).

After the step S260 is performed, the CPU 2 determines whether the value of the counter "i" exceeds the main scan width (S261). When the result at step S261 is negative, the control of the CPU 2 is transferred to the step S259. Otherwise the CPU 2 increments the counter "j" (S262), and sets the counter "i" to 1 (S263).

After the step S263 is performed, the CPU 2 determines whether the value of the counter "j" exceeds the sub-scan width (S264). When the result at step S264 is negative, the control of the CPU 2 is transferred to the step S259. Otherwise the combined image file is created from the two files without considering the offset values, and the CPU 2 causes the printer unit 9 to print the image of the combined image file on paper (S265). After the step S265 is performed, the control of the CPU 2 is transferred to step S266 shown in FIG. 33, which will be described later.

As the result of the step S265, the operator obtains the printed image of the combined image file as shown in FIG. 34C. As the offset values between the two files are not considered, the simple superimposing is inadequate for providing a proper page layout of the combined image file. The printed image sheet, produced by the printer unit 9, includes a vertical scale 14a that is parallel to the sub-scanning direction and a horizontal scale 14b that is parallel to the main scanning direction. Hence, the operator easily determines the offset values (m, n) that provide a proper page layout of the combined image file, by observing the relationship in position between the scales 14a and 14b and the printed image.

At a start of the file combining procedure of FIG. 33, the CPU 2 determines whether the operator inputs the offset values in order to provide a proper page layout of the combined image file (S266). When the result at step S266 is negative, the control of the CPU 2 is transferred to the image file transmission process that is the same as the steps S191 and S192 in the procedure shown in FIG. 26.

When the result at step S266 is affirmative, the CPU 2 receives the offset values (m, n) that are input by the operator from the operation unit 7 (S267). After the step S267 is performed, the CPU 2 sets the counter "i" to 1 (S268), and sets the counter "j" to 1 (S269). The CPU 2 determines whether the value of "i−m" is larger than 1 (S270). When the result at step S270 is affirmative, the CPU 2 determines whether the value of "j−n" is larger than 1 (S271). Otherwise the control of the CPU 2 is transferred to step S273, which will be described later.

When the result at step S271 is affirmative, the CPU 2 calculates the results of OR operations of the two image data with the offset values considered, and stores the values of f (g($X_i$, $Y_j$), h($X_i-m$, $Y_j-n$)) into the ROM/RAM 8 (S272). After the step S272 is performed, the CPU 2 increments the counter "i" (S273).

After the step S273 is performed, the CPU 2 determines whether the value of the counter "i" exceeds the main scan width (S274). When the result at step S274 is negative, the control of the CPU 2 is transferred to the step S270. Otherwise the CPU 2 increments the counter "j" (S275), and sets the counter "i" to 1 (S276).

After the step S276 is performed, the CPU 2 determines whether the value of the counter "j" exceeds the sub-scan width (S277). When the result at step S277 is negative, the control of the CPU 2 is transferred to the step S270. Otherwise the combined image file "NEW", as shown in FIG. 34D, is created from the two files with the offset values considered, and the control of the CPU 2 is transferred to the image file transmission process that is the same as the steps S191 and S192 in the procedure shown in FIG. 26. As described earlier, the image file transmission procedure is carried out with respect to the combined image file.

When the result at step S270 is negative, the control of the CPU 2 is transferred to the step S273, and the steps S271 and S272 are not performed.

When the result at step S271 is negative, the CPU 2 increments the counter "j" (S278). After the step S278 is performed, the control of the CPU 2 is transferred to the step S277.

According to the above-described embodiment, the image processing device 10 can create a combined image file having a proper page layout, from plural document files of the image memory 6 of the IPD 10.

In the above-described embodiment, both the file combining process and the combined image file transmission process are carried out by the CPU 2 of the image processing device 10. Alternatively, the file combining process may be carried out by the external computer 11, instead of the CPU 2 of the image processing device 10. In such alternative embodiment, after the combined image file, transmitted by the image processing device 10, is received at the external computer 11, the controller of the external computer 11 performs the steps S250 through S278 of the file combining procedure of FIG. 32 and FIG. 33.

Figure 35A:
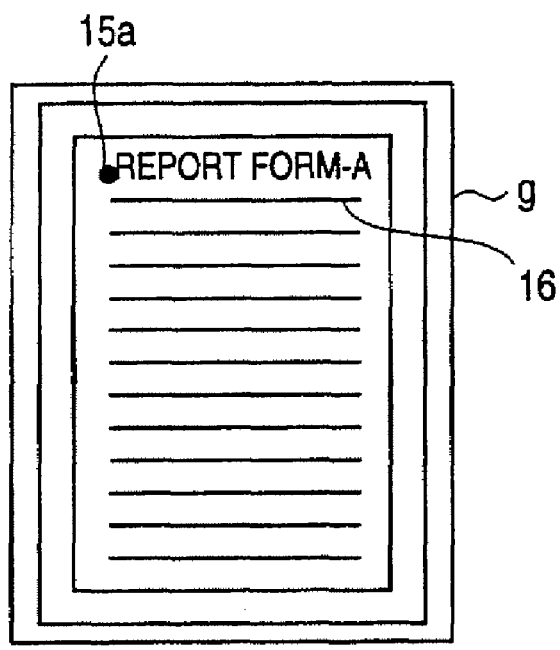
FIG. 35A, FIG. 35B and FIG. 35C are diagrams showing an example of the file combining process in which plural document files are combined together.
Figure 35B:
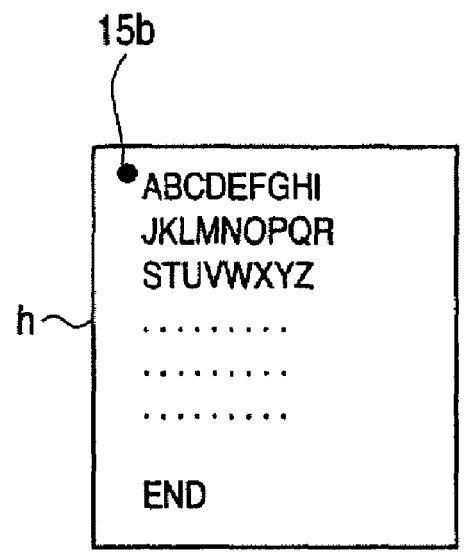
Figure 35C:
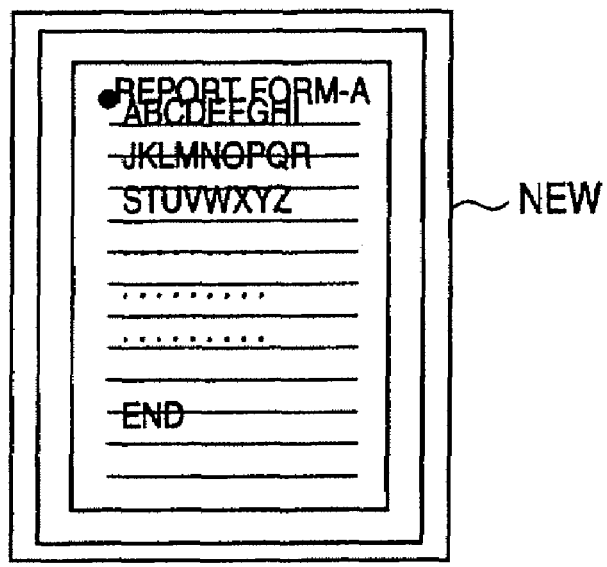
Figure 36:
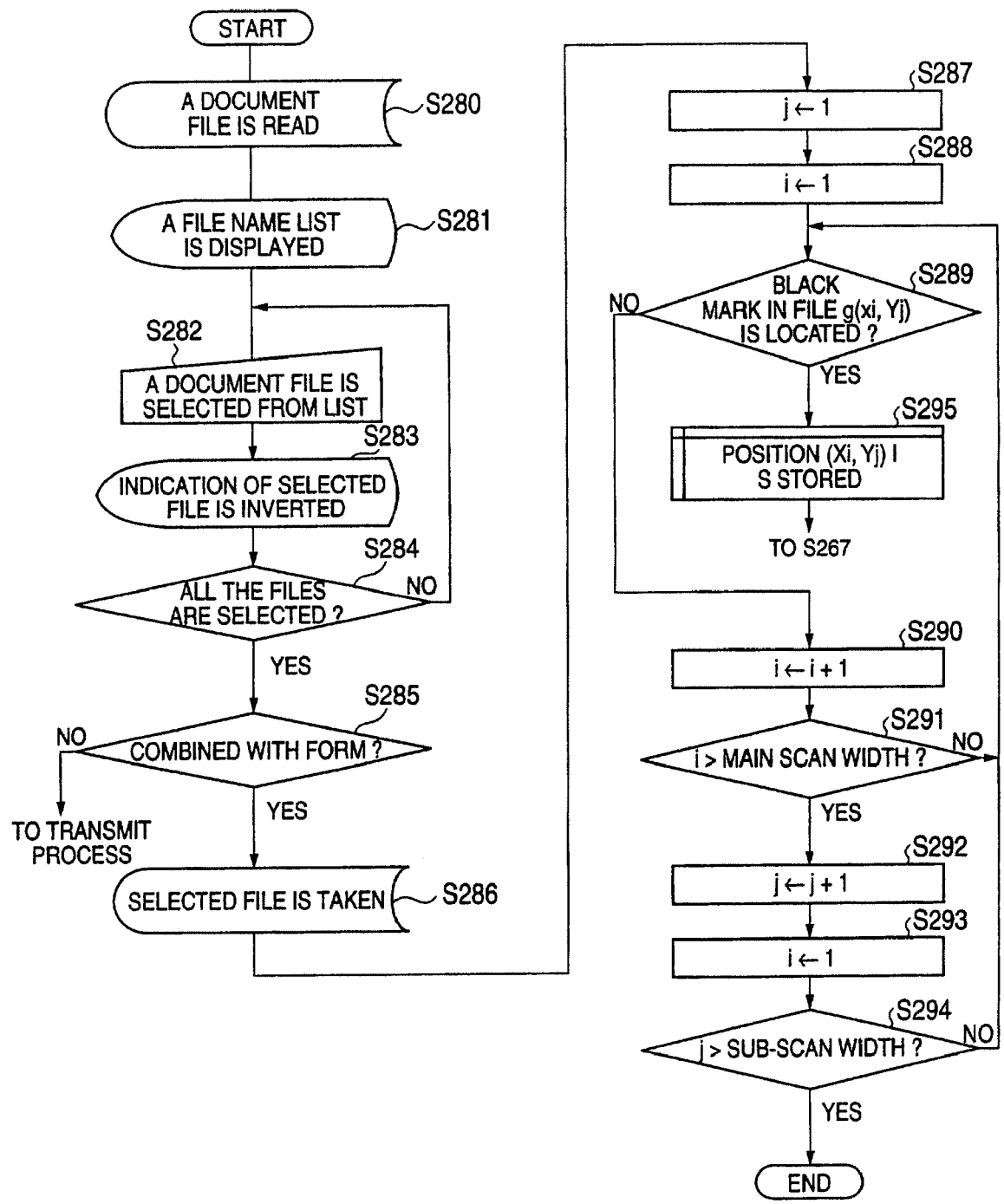
FIG. 36 is a flowchart for explaining a file combining procedure executed by the image processing system of the present embodiment.

FIG. 35A, FIG. 35B and FIG. 35C show an example of the file combining process in which plural document files are combined together. FIG. 36 shows a file combining procedure executed by the CPU 2 of the IPD 10 in the image processing system of the present embodiment.

In the image processing system of the present embodiment, which is described with reference to FIG. 35A through FIG. 36, the determination of the offset values, which is manually carried out by the operator by observing the printed image derived from the procedure of FIG. 32, is automatically carried out.

At a start of the file combining procedure of FIG. 36, the CPU 2 reads the image data of the stored document files from the image memory 6 (S280). The CPU 2 causes the display unit 3 to display a document list, containing a number of document names or identifiers of the document files of the image memory 6, based on the read image data (S281).

With the document list displayed, the CPU 2 causes the operator to select a desired document file from the document list by inputting key-in information (S282). After the step S282 is performed, the CPU 2 causes the display unit 3 to invert the indication of the selected document file within the document file list (S283). After the step S283 is performed, the CPU 2 determines whether all the document files that should be transmitted are selected (S284).

When the result at step S284 is negative, the control of the CPU 2 is transferred to the step S282. Otherwise the CPU 2 determines whether the operator desires to combine the document files prior to the image file transmission (S285).

When the result at step S285 is negative (or when the operator does not desire the file combination), the control of the CPU 2 is transferred to an image file transmission process that is the same as the steps S191 and S192 in the procedure shown in FIG. 26.

When the result at step S285 is affirmative (or when the operator desires the file combination), the CPU 2 reads the selected document files that are to be combined, from the image memory 6 (S286). Suppose that, in the present embodiment, the form file "g", shown in FIG. 35A, contains picture elements "g(Xi, Yj)" with a black dot 15a attached to the start position of the image thereof, the document file "h", shown in FIG. 35B, contains picture elements "h(Xi, Yj)" with a black dot 15b attached to the start position of the image thereof, and a combined image file "NEW", shown in FIG. 35C, contains picture elements "f(Xi, Yj)". The image combination of the two files is achieved by performing OR operations of the two image data such that the black dot 15b of the file "h" matches with the black dot 15a of the file "g". It is assumed that the conditions 1≦i≦the main scan width, and 1≦j≦the sub-scan width are satisfied.

After the step S286 is performed, the CPU 2 sets the counter "i" to 1 (S287), and sets the counter "j" to 1 (S288). The CPU 2 determines whether the black dot 15a of the file "g" is located at the current position indicated by the counter "i" and the counter "j" (S289). When the result at step S289 is negative, the control of the CPU 2 is transferred to step S290, which will be described later.

When the result at step S289 is affirmative, the CPU 2 stores the position (Xi, Yj) as the black mark location (S295). After the step S295 is performed, the control of the CPU 2 is transferred to the step S267 shown in FIG. 33.

The CPU 2 increments the counter "i" (S290). After the step S290 is performed, the CPU 2 determines whether the value of the counter "i" exceeds the main scan width (S291). When the result at step S291 is negative, the control of the CPU 2 is transferred to the step S289. Otherwise the CPU 2 increments the counter "j" (S292), and sets the counter "i" to 1 (S293).

After the step S293 is performed, the CPU 2 determines whether the value of the counter "j" exceeds the sub-scan width (S294). When the result at step S294 is negative, the control of the CPU 2 is transferred to the step S289. Otherwise the procedure of FIG. 36 is finished. As the result of the step S295, the black dot position (Xi, Yj) with respect to the file "g" is determined and stored. Similarly, the black dot position (Xi, Yj) with respect to the file "h" is also determined and stored by performing the steps S287 to S294 shown in FIG. 36.

In the present embodiment, the CPU 2 calculates the offset values (m, n) that provides a proper page layout of the combined image file, based on the black dot positions stored at the step S295 shown in FIG. 36. Thus, the calculated offset values (m, n) are used at the step S267 in the file combining procedure of FIG. 33. According to the above-described embodiment, with the automatic determination of the offset values, the image processing device 10 can create a combined image file having a proper page layout, from plural document files of the image memory 6 of the IPD 10. Further, the combined image file is transmitted from the image processing device 10 to one of the plurality of external computers 11 through the network 12.

In the above-described embodiment, both the file combining process and the combined image file transmission process are carried out by the CPU 2 of the image processing device 10. Alternatively, the file combining process may be carried out by the external computer 11, instead of the CPU 2 of the image processing device 10. In such alternative embodiment, after the combined image file, transmitted by the image processing device 10, is received at the external computer 11, the controller of the external computer 11 performs the steps S280 through S294 of the file combining procedure of FIG. 36.

The image processing device, method and system of the present embodiment are effective in enabling the receiver of the image file to immediately overview the contents of the image file or the like, so as to increase the convenience of the remote scanning capability to the users. The image processing device, method and system of the present embodiment are effective in enabling the receiver's computer to perform various post-processing procedures of the image file after the reception of the image file, in order to increase the convenience of the remote scanning capability to the users.

Next, a description will be given, with reference to FIG. 37 through FIG. 41, of a fifth preferred embodiment of the remote-scan image processing system of the invention.

Figure 37:
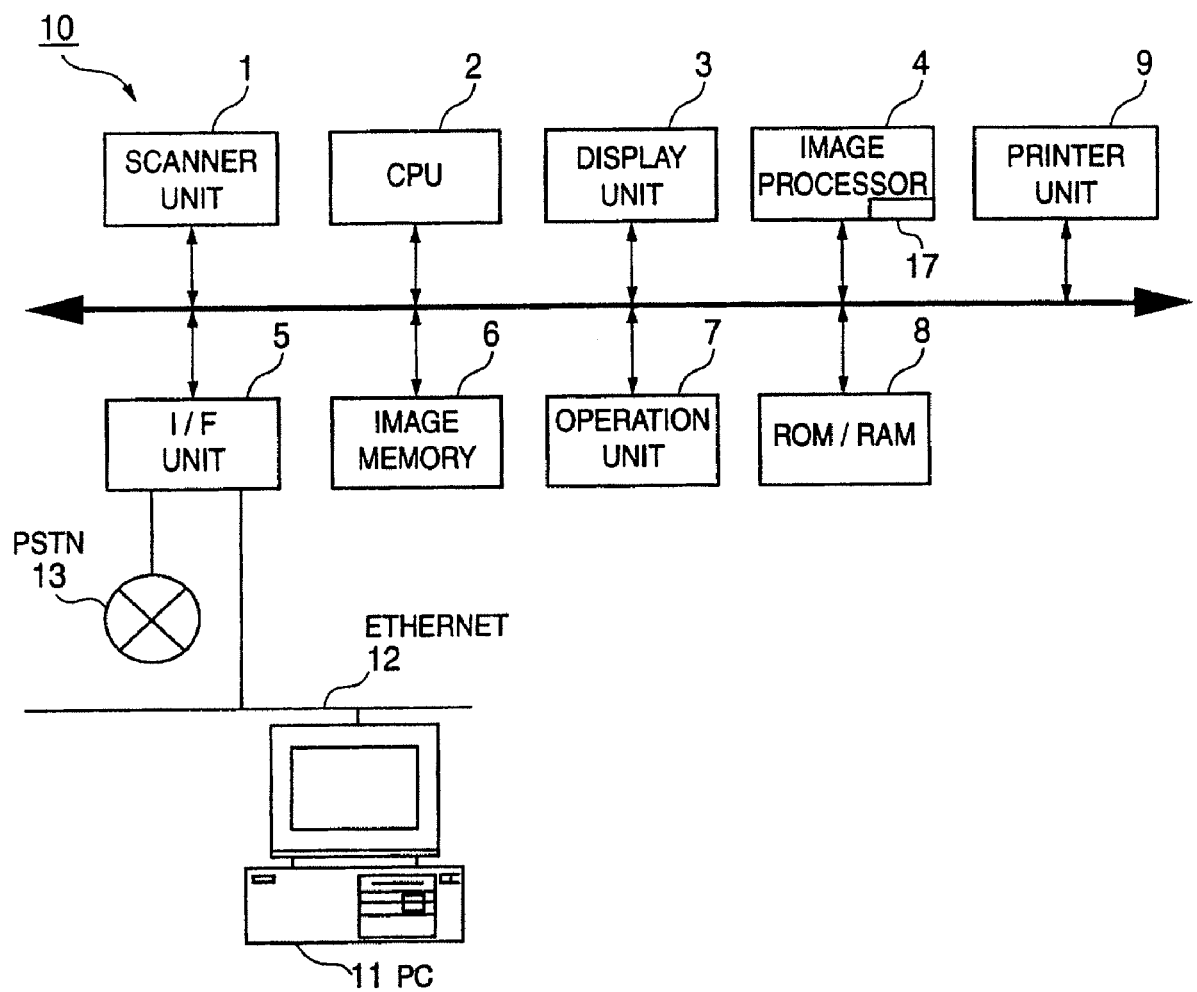
FIG. 37 is a block diagram of a fifth preferred embodiment of the image processing system of the invention.

FIG. 37 shows the fifth preferred embodiment of the remote-scan image processing system of the invention. As shown in FIG. 37, the remote-scan image processing system of the present embodiment is essentially the same as that of the previous embodiment shown in FIG. 29 except that the image processor 4 of the image processing device 10 of the present embodiment includes an image compression unit 17. In the image processing system of the present embodiment, the image processing device 10 (which will be called the IPD 10), and the plurality of external computers (PC) 11, connected to the image processing device 10 through the local area network 12, are provided. In FIG. 37, the elements that are essentially the same corresponding elements in FIG. 29 are designated by the same reference numerals, and a description thereof will be omitted.

In the image processing system shown in FIG. 37, the image compression unit 17 produces compressed image data from the image data read by the scanner unit 1 in accordance with the available storage amount of the image memory 6. When reading image data from a document by using the scanner unit 1, the CPU 2 of the IPD 10 detects whether the available storage amount of the image memory 6 is less than the memory space needed to store the read image data. When the available storage amount is less than the needed memory space, the CPU 2 calculates a proper compression ratio and causes the compression unit 17 to produce a compressed image data from the read image data by the calculated compression ratio. Therefore, the image data read by the scanner unit 1 can safely be stored into the image memory 6 without causing an error in the image data storage procedure.

Figure 38:
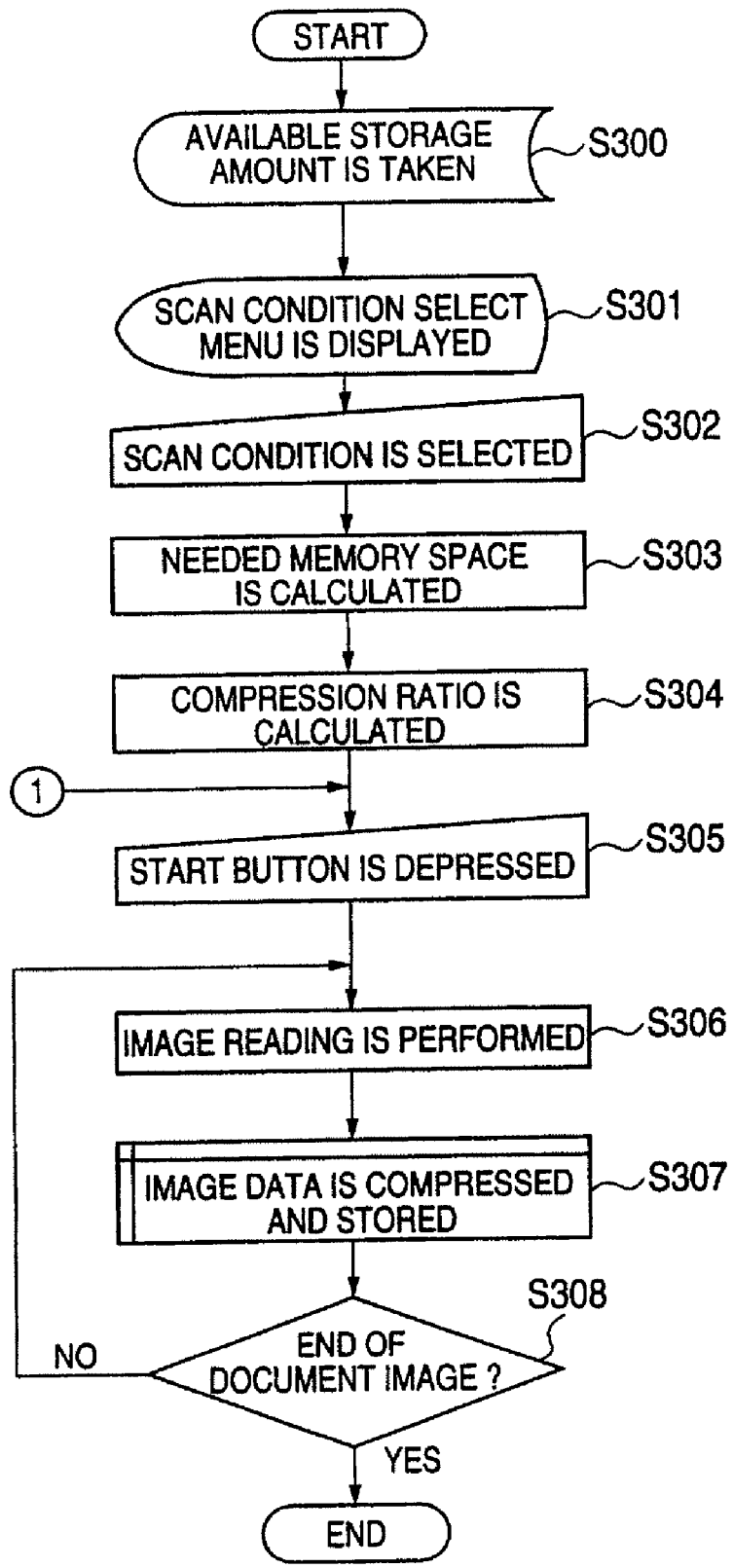
FIG. 38 is a flowchart for explaining an image data storage routine executed by the image processing system of the present embodiment.

FIG. 38 shows an image data storage procedure executed by the CPU 2 of the IPD 10 in the image processing system of the present embodiment.

As shown in FIG. 38, at a start of the image data storage procedure, the CPU 2 detects the available storage amount of the image memory 6 (S300). Suppose that the document is set on the contact glass of the scanner unit 1 or the ADF thereof, and the number of pages of the document is input from the operation unit 7.

The CPU 2 causes the display unit 3 to display the initial menu, as shown in FIG. 5, which contains the scan condition selection list (S301). With the initial menu displayed, the CPU 2 causes the operator to input the scan condition choice, the destination identifier and others from the operation unit 7 (S302). The CPU 2 calculates the needed memory space based on the number of pages of the document and the selected scan condition (S303). The CPU 2 at this time detects whether the available storage amount of the image memory 6 is less than the memory space needed to store the read image data. When the available storage amount is less than the needed memory space, the CPU 2 calculates a proper compression ratio such that it enables the image memory 6 to store the read image data without causing an error (S304).

For example, suppose that the image reading conditions are: the available storage amount of the image memory 6 is 10 Mbytes, the document is A4 size and contains 10 pages, the selected scan condition is 200 dpi, and the images are in color and 8-bit gray scale. In this case, the amount of image data read from each page of the document is about 3.8 Mbytes, and the needed memory space amounts to about 38 Mbytes. In the present embodiment, the CPU 2, at the step S304, calculates the minimum compression ratio based on the ratio of the available storage amount to the needed memory space, namely, 10 Mbytes/38 Mbytes×100=26.3%.

After the step S304 is performed, the CPU 2 causes the operator to depresses the start button in the operation unit 7 to start the scanner unit 1 (S305). The CPU 2 performs the image reading of the document by controlling the scanner unit 1 (S306). The CPU 2 causes the image processor 4 to perform given image processing processes of the image data read by the scanner unit 1, and causes the image compression unit 17 to produce the compressed image data from the image data by using the compression ratio obtained at the step S304, and causes the image memory 6 to store the compressed image data, including the destination identifier and others, in the available storage portion of the image memory 6 (S307). As for the above case, the 26.3% compressed image data are safely stored in the image memory 6 without causing an error.

After the step S307 is performed, the CPU 2 determines whether an end of the image reading is detected by the scanner unit 1 (S308). When the result at step S308 is negative, the control of the CPU 2 is transferred to the step S306. When the result at step S308 is affirmative, the image data storage procedure of FIG. 38 is finished.

Figure 39:
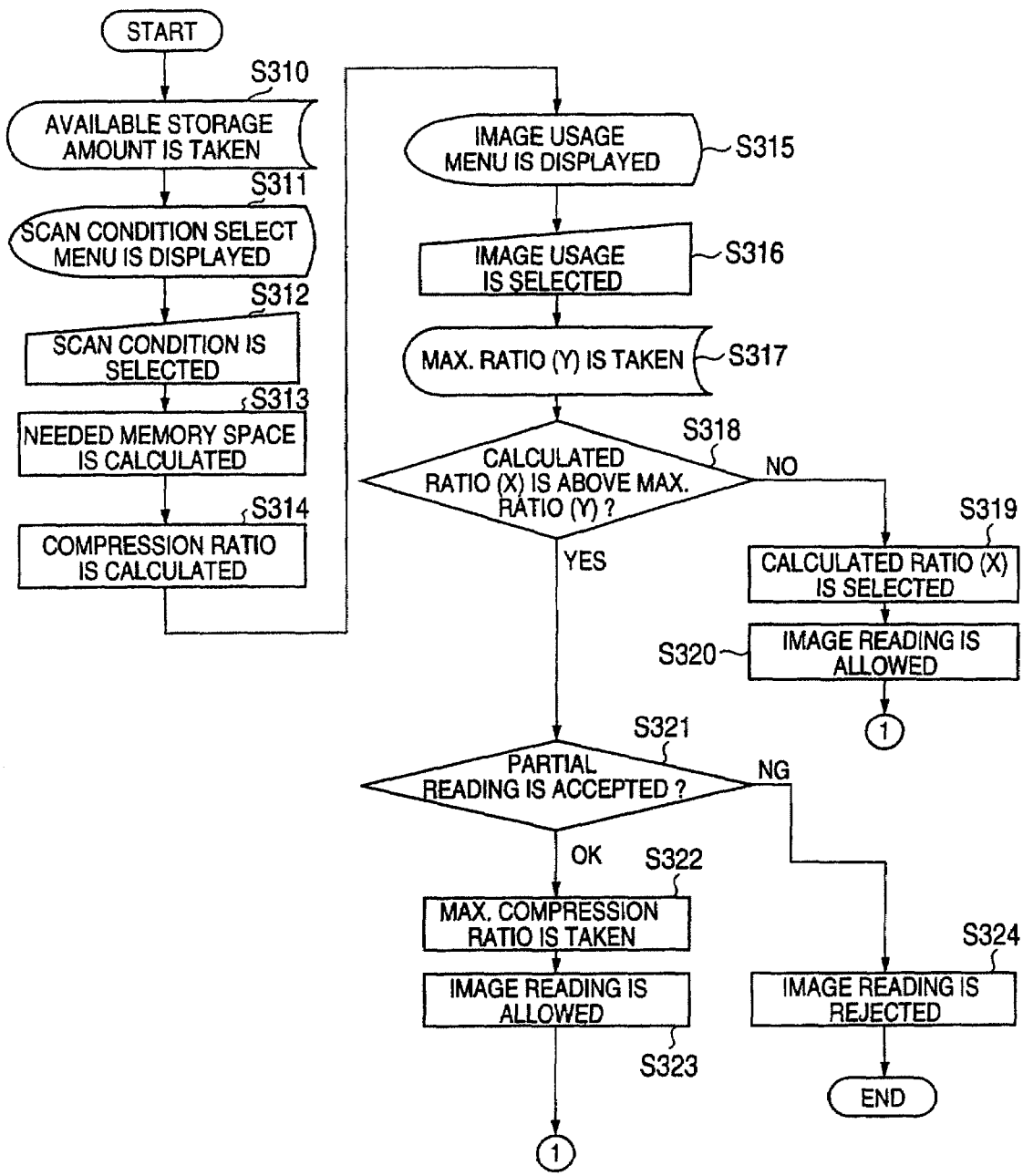
FIG. 39 is a flowchart for explaining another image data storage routine executed by the image processing system of the present embodiment.

FIG. 39 shows another image data storage procedure executed by the CPU 2 of the IPD 10 in the image processing system of the present embodiment. In the present embodiment, a maximum compression ratio that is permissible to the image compression unit 17 when the image usage of image data is considered is predetermined.

In the present embodiment, an image usage selection list is provided for the operator to select one of a plurality of image usage items for the image data read by the scanner unit 1, and maximum compression ratios are predetermined for the respective image usage items of the selection list such that each maximum compression ratio is suited to a corresponding image usage of the image data.

For example, the maximum compression ratios for the respective image usage items of the selection list such that "1/30" is set for thumbnail (T/N) images, "1/20" is for OCR images and "1/10" is set for high-quality reproduction images. An image usage selection menu including the image usage selection list is displayed on the display unit 3 prior to the image reading of the document.

At a start of the image data storage procedure shown in FIG. 39, the CPU 2 detects the available storage amount of the image memory 6 (S310). Suppose that the document is set on the contact glass of the scanner unit 1 or the ADF thereof, and the number of pages of the document is input from the operation unit 7.

The CPU 2 causes the display unit 3 to display the initial menu, as shown in FIG. 5, which contains the scan condition selection list (S311). With the initial menu displayed, the CPU 2 causes the operator to input the scan condition choice, the destination identifier and others from the operation unit 7 (S312). The CPU 2 calculates the needed memory space based on the number of pages of the document and the selected scan condition (S313). The CPU 2 at this time detects whether the available storage amount of the image memory 6 is less than the memory space needed to store the read image data. When the available storage amount is less than the needed memory space, the CPU 2 calculates a proper compression ratio (X) such that it enables the image memory 6 to store the read image data without causing an error (S314).

After the step S314 is performed, the CPU 2 causes the display unit 3 to display the image usage selection menu including the image usage selection list (S315). The CPU 2 causes the operator to select one of the plurality of image usage items from the selection list (S316). After the step S316 is performed, the CPU 2 detects the maximum compression ratio (Y) that is predetermined for the selected image usage item (S317).

After the step S317 is performed, the CPU 2 determines whether the calculated compression ratio (X) is above the maximum compression ratio (Y) (S318). When the result at step S318 is negative (X<Y), the CPU 2 selects the calculated compression ratio (X) (S319). In this case, the image data storage process would cause no error, and the CPU 2 allows the image reading of the document to be performed by using the scanner unit 1 (S320). After the step S320 is performed, the control of the CPU 2 is transferred to the step S305 shown in FIG. 38.

When the result at step S318 is affirmative (X≧Y), the amount of the compressed image data obtained with the maximum compression ratio is excessively large, and the image data storage process would cause an overflow of the image data in the image memory 6. The CPU 2 determines whether the operator accepts partial image reading of the document by the scanner unit 1 and the image data compression with the maximum compression ratio (S321).

When the result at step S321 is affirmative, the CPU 2 selects the maximum compression ratio (Y) (S322). The CPU 2 allows the image reading of the document to be performed by using the scanner unit 1 (S323). After the step S323 is performed, the control of the CPU 2 is transferred to the step S305 shown in FIG. 38.

When the result at step S321 is negative, the CPU 2 rejects the image reading of the document by the scanner unit 1 (S324). After the step S324 is performed, the procedure of FIG. 39 is finished.

Figure 40:
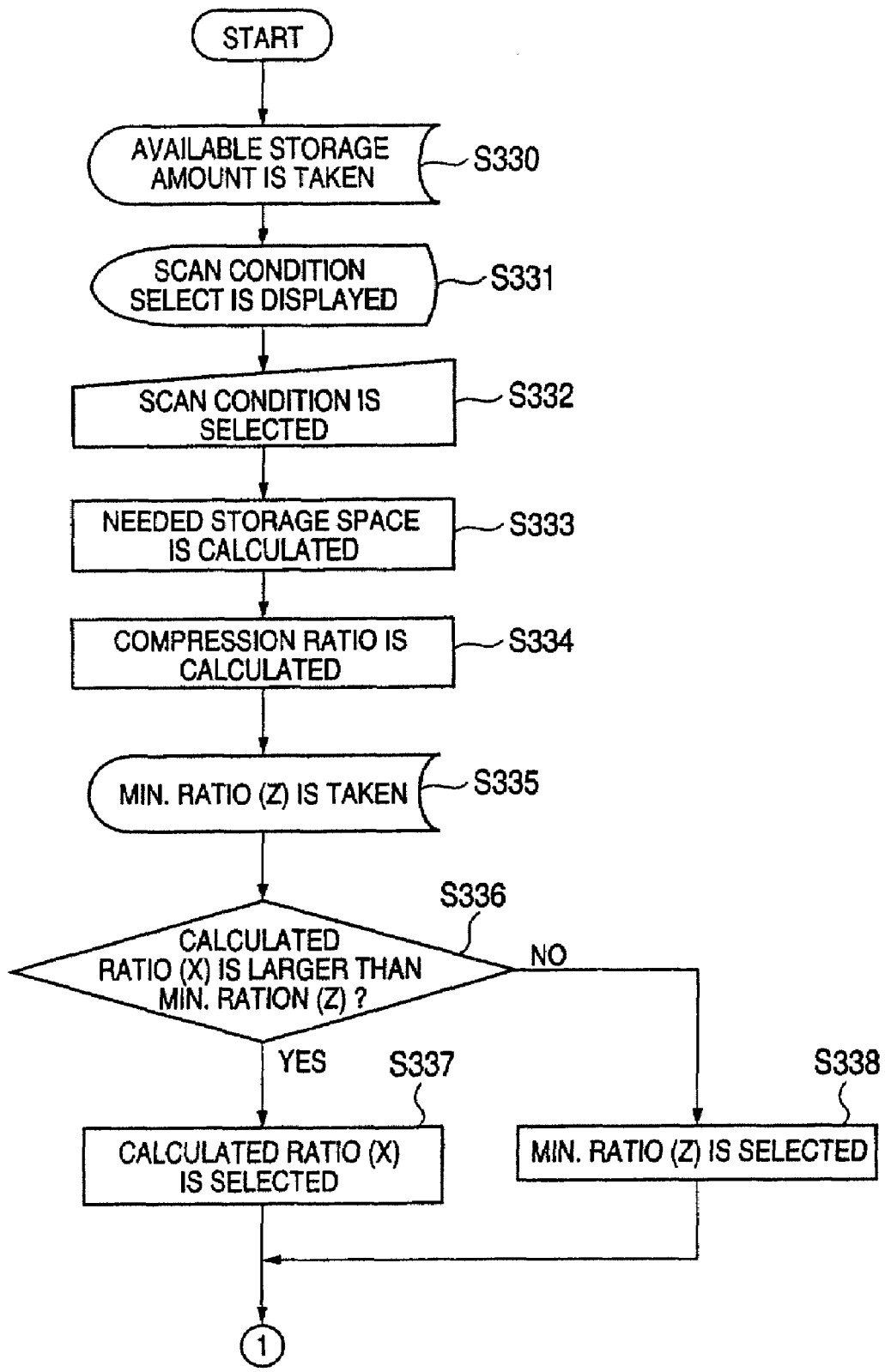
FIG. 40 is a flowchart for explaining another image data storage routine executed by the image processing system of the present embodiment.

FIG. 40 shows another image data storage procedure executed by the CPU 2 of the IPD 10 in the image processing system of the present embodiment. In the present embodiment, a minimum compression ratio that is permissible to the image compression unit 17 is predetermined regardless of which image usage of the image data is selected.

At a start of the image data storage procedure shown in FIG. 40, the CPU 2 detects the available storage amount of the image memory 6 (S330). Suppose that the document is set on the contact glass of the scanner unit 1 or the ADF thereof, and the number of pages of the document is input from the operation unit 7.

The CPU 2 causes the display unit 3 to display the initial menu, as shown in FIG. 5, which contains the scan condition selection list (S331). With the initial menu displayed, the CPU 2 causes the operator to input the scan condition choice, the destination identifier and others from the operation unit 7 (S332). The CPU 2 calculates the needed memory space based on the number of pages of the document and the selected scan condition (S333). The CPU 2 at this time detects whether the available storage amount of the image memory 6 is less than the memory space needed to store the read image data. When the available storage amount is less than the needed memory space, the CPU 2 calculates a proper compression ratio (X) such that it enables the image memory 6 to store the read image data without causing an error (S334).

After the step S334 is performed, the CPU 2 detects the minimum compression ratio (Z) that is predetermined (S335). The CPU 2 determines whether the calculated compression ratio (X) is above the minimum compression ratio (Z) (S336). When the result at step S336 is negative (X<Z), the CPU 2 selects the minimum compression ratio (Z) (S338). In this case, the image data storage process would cause no error, and the control of the CPU 2 is transferred to the step S305 shown in FIG. 38.

When the result at step S336 is affirmative (X≧Z), the CPU 2 selects the calculated compression ratio (X) (S337). In this case, the image data storage process would cause no error, and the control of the CPU 2 is transferred to the step S305 shown in FIG. 38.

In the image processing system of the above-described embodiment, the IPD 10 stores the image data, read from documents, into the image memory 6 of the IPD 10 and transmits an image file, derived from the stored image data of the image memory 6 and containing the destination identifier and other identifiers, to one of the plurality of external computers (PC) 11 through the network 12. The present invention is not limited to the above-described embodiment. Alternatively, one of the plurality of external computers 11 on the network 12 may perform the image data storage process in place of the IPD 10.

Figure 41:
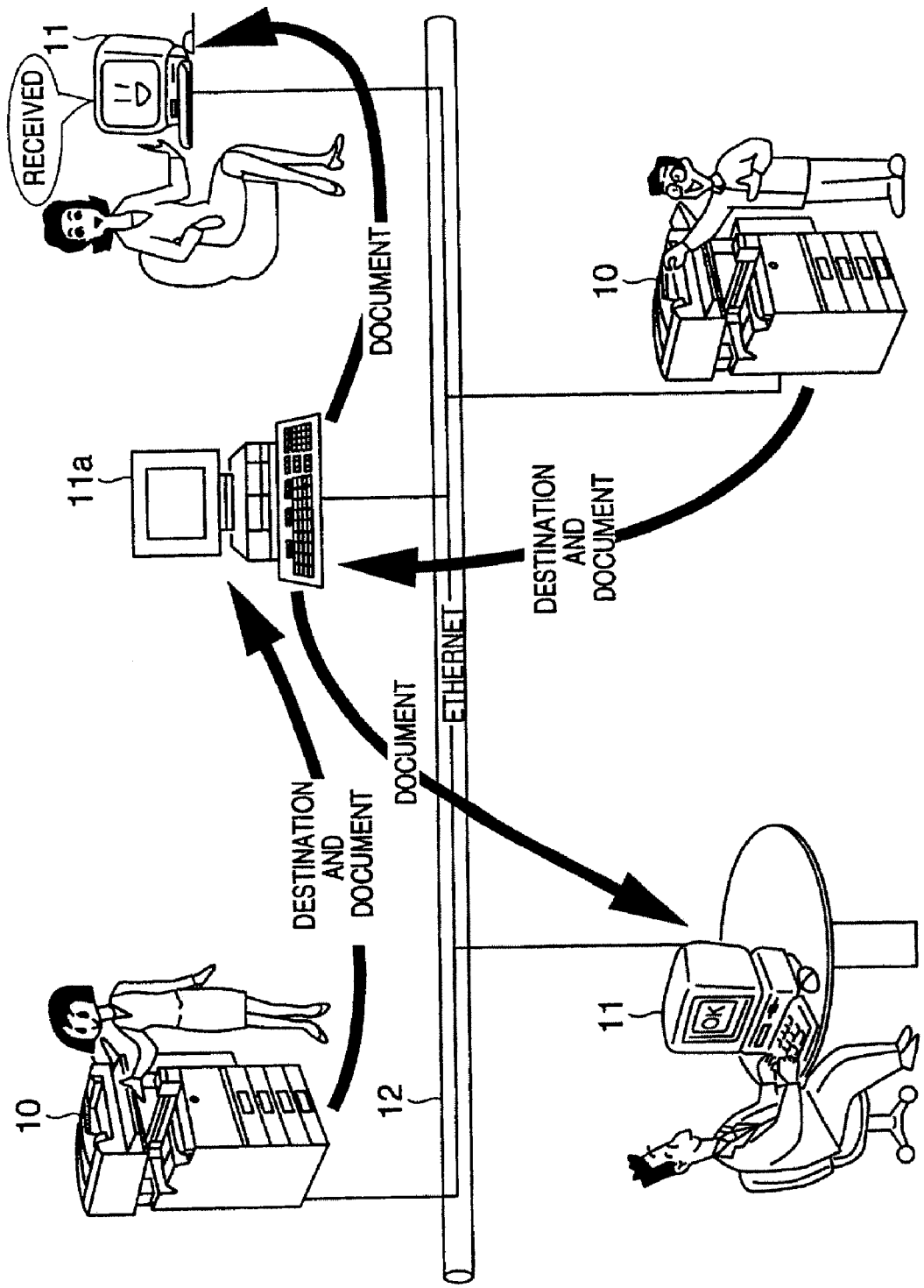
FIG. 41 is a diagram for explaining an image data storage procedure performed in one embodiment of the image processing system of the invention.

FIG. 41 shows an image data storage procedure performed in one embodiment of the image processing system of the invention.

In the image processing system shown in FIG. 41, a plurality of image processing devices (IPD) 10 and a plurality of external computers (PC) 11 are connected together via the local area network 12 (for example, the Ethernet). The plurality of external computers 11 on the network 12 include a server 11a that receives and stores image data sent by one of the IPDs 10, and transmits the stored image data to another external computer 11 through the network 12. Alternatively, two or more among the plurality of external computers 11 may be predetermined as being the servers 11a.

As shown in FIG. 41, in the image processing system of the present embodiment, one of the IPDs 10 reads the image data from documents by using the scanner unit 1, and transmits an image file, derived from the image data and containing the destination identifier and other identifiers, to the server 11a through the network 12. The server 11a receives and temporarily stores the image data sent by the one of the IPDs 10, and transmits the stored image data to the destination PC 11 through the network 12.

In the present embodiment, the image processing system can utilize the storage capacity of the external computer 11a, provided as the server, to store a very large amount of image data, which exceeds the available storage amount of the image memory 6 of the IPD 10. According to the present embodiment, the IPD 10 can read a very large amount of image data from documents, which exceeds the available storage amount of the image memory 6 of the IPD 10, and transmit the image data to the server 11a through the network 12.

The present invention is not limited to the above-described embodiments, and variations and modifications may be made without departing from the scope of the present invention.

Further, the present invention is based on Japanese priority application No. 2000-133598, filed on May 2, 2000, and Japanese priority application No. 2000-233323, filed on Aug. 1, 2000, the entire contents of which are hereby incorporated by reference.

What is claimed is:

1. An image processing system including an image processing device and a plurality of external stations connected to the image processing device through a network, the image processing device comprising:

a scanner unit reading image data from a document;

an image memory storing a plurality of image data read from documents by using the scanner unit;

a transmission unit transmitting an image file, derived from the stored image data of the image memory, to one of the plurality of external stations through the network; and an operation unit selecting one of the external stations as a destination station which receives the image file through the network, by input information;

wherein said one of the external stations comprises a file format selection unit which selects one of a plurality of file formats from a file format list, as a file format of an image file received at said one of the plurality of external stations, in accordance with input information input by an operator on said one of the external stations, and wherein the image processing device further comprises:

a storage unit that stores the file format list containing the file format selected for said one of the external stations; and a file combining unit combining a plurality of image files to produce a combined image file from the plurality of image data from the image memory, in accordance with the selected file format from the file format list of the storage unit, before the image file transmission.

2. An image processing device which transmits an image file to one of a plurality of external stations through a network, comprising:

a scanner unit reading image data from a document;

an image memory storing a plurality of image data read from documents by the scanner unit;

a transmission unit transmitting an image file, derived from the stored image data of the image memory, to one of the external stations through the network;

an operation unit selecting one of the external stations as a destination station which receives the image file through the network, in accordance with input information input by an operator from the operation unit; and a file combining unit combining a plurality of image files to produce a combined image file from the plurality of image data from the image memory, in accordance with a defined file format, before the image file transmission, so that the transmission unit transmits the combined image file, produced by the file combining unit, through the network to said one of the external stations selected as the destination station by the operation unit.

3. An image processing method for transmitting an image file from an image processing device to one of a plurality of external stations through a network, comprising:

reading image data from a document by using a scanner unit;

storing a plurality of image data, read from documents by using the scanner unit, into an image memory;

transmitting an image file, derived from the stored image data of the image memory, to one of the external stations through the network;

selecting one of the external stations as a destination station which receives the image file through the network, in accordance with input information input by an operator from an operation unit; and combining a plurality of image files to produce a combined image file from the plurality of image data from the image memory, in accordance with a defined file format, before the image file transmission, so that the combined image file is transmitted through the network to said one of the external stations selected as the destination station.

4. An image processing system including an image processing device and a plurality of external stations connected to the image processing device through a network, the image processing device comprising:

a scanner unit reading image data from a document, the scanner unit being provided with an automatic document feeder that transports the document to the scanner unit when reading of the image data;

an image memory storing a plurality of image data read from documents by the scanner unit;

a transmission unit transmitting an image file, derived from the stored image data of the image memory, to one of the external stations through the network;

an operation unit selecting one of the external stations as a destination station which receives the image file through the network, in accordance with input information that is input by an operator from the operation unit; and a file combining unit combining a plurality of image files to produce a combined image file from the plurality of image data from the image memory, in accordance with a defined file format, before the image file transmission, so that the transmission unit transmits the combined image file, produced by the file combining unit, through the network to said one of the external stations selected as the destination station by the operation unit.

5. The image processing system according to claim 4, wherein one of the plurality of external stations comprises a secondary file combining unit which combines a plurality of image data, received from the image processing device through the network, into a single image file.

6. An image processing method for transmitting an image file from an image processing device to one of a plurality of external stations through a network, comprising:

reading image data from a document by using a scanner unit;

storing a plurality of image data, read from documents by using the scanner unit, into an image memory;

selecting one of the external stations as a destination station which receives the image file through the network, in accordance with input information that is input by an operator from an operation unit;

transmitting the plurality of image data, stored in the image memory, from the image processing device to said one of the external stations, selected as the destination station, through the network;

receiving the plurality of image data, transmitted by the image processing device, at the destination station; and combining the plurality of image files, received at the destination station, to produce a combined image file in accordance with a defined file format.

7. An image processing system including an image processing device and a plurality of external stations connected to the image processing device through a network, the image processing device comprising:

an image memory storing a plurality of image data, read from documents by a scanner unit;

a transmission unit transmitting an image file, derived from the stored image data of the image memory, to one of the external stations through the network;

an image data selecting unit selecting one of a plurality of document identifiers of a document list as the image file which is transmitted to one of the external stations through the network, in accordance with key-in information that is input by an operator; and
a destination identifier selecting unit selecting one of a plurality of destination identifiers of a destination list as a destination group which receives the image file through the network, in accordance with key-in information that is input by the operator,
wherein one of the plurality of external stations comprises a file combining unit which combines a plurality of image data, received from the image processing device through the network, into a single image file,
wherein one of the external stations comprises:
a secondary image data selecting unit selecting one of the plurality of document identifiers of the document list as the image file which is received from the image processing device through the network, in accordance with key-in information that is input by an operator; and
a secondary destination identifier selecting unit selecting one of the plurality of destination identifiers of the destination list as the destination group which receives the image file from the image processing device through the network, in accordance with key-in information that is input by the operator.

8. The image processing system according to claim 7, wherein the image processing device further comprises a secondary file combining unit which combines a plurality of image files, derived from the image data of the image memory indicated by the document identifiers selected from the document list, into a single image file before the image file transmission.

9. An image processing device which transmits an image file to one of a plurality of external stations through a network, comprising:
an image memory storing a plurality of image data, read from documents by a scanner unit;
a transmission unit transmitting an image file, derived from the stored image data of the image memory, to one of the external stations through the network;
an image data selecting unit selecting one of a plurality of document identifiers of a document list as the image file which is transmitted to one of the external stations through the network, in accordance with key-in information that is input by an operator;
a file combining unit combines a plurality of image files, derived from the image data of the image memory indicated by the document identifiers selected from the document list, into a single image file before the image file transmission; and
a destination identifier selecting unit selecting one of a plurality of destination identifiers of a destination list as a destination group which receives the image file through the network, in accordance with key-in information that is input by the operator,
wherein the file combining unit produces a newly combined image file from the selected image data based on offset values that are input by the operator.

10. An image processing method for transmitting an image file from an image processing device to one of a plurality of external stations through a network, comprising: storing a plurality of image data, read from documents by a scanner unit, into an image memory; selecting one of a plurality of document identifiers of a document list as the image file which is transmitted to one of the external stations through the network, in accordance with key-in information that is input by an operator; selecting one of a plurality of destination identifiers of a destination list, as a destination group which receives the image file through the network, in accordance with key-in information that is input by the operator; combining a plurality of image files, indicated by the selected document identifier, into a single image file wherein a newly combined image file is produced from the selected image data based on offset values that are input by the operator; and transmitting the combined image file through the network to the destination group of said one of the external stations selected as the destination station.

11. An image processing device which transmits an image file to one of a plurality of external stations through a network, comprising:
a scanner unit reading image data from a document;
an image memory storing the image data read by the scanner unit;
a first file combining unit producing a combined image file from document files selected from the stored image data of the image memory;
a printer unit printing an image of the combined image file produced by the first file combining unit, wherein an operator determines offset values of the selected document files from the printed image of the combined image file;
a second file combining unit producing a newly combined image file from the selected document files based on the offset values; and
a transmission unit transmitting the newly combined image file, produced by the second file combining unit, to one of the plurality of external stations through the network.

12. The image processing device according to claim 11, wherein the printer unit supplies a printed image sheet including a vertical scale that is parallel to a sub-scanning direction and a horizontal scale parallel to a main scanning direction, in order to facilitate the operator's determination of the offset values that provide a proper page layout of the combined image file.

13. An image processing device which transmits an image file to one of a plurality of external stations through a network, comprising:
a scanner unit reading image data from a document;
an image memory storing the image data read by the scanner unit;
a file combining unit producing a combined image file from document files selected from the stored image data of the image memory, the file combining unit performing OR operations of the image data of the selected files such that black dots, fixed to start positions of the images of the selected files, match with each other; and
a transmission unit transmitting the combined image file, produced by the file combining unit, to one of the plurality of external stations through the network.

14. An image processing system including an image processing device and a plurality of external stations connected to the image processing device through a network, the image processing device comprising:
a scanner unit reading image data from a document;
an image memory storing the image data read by the scanner unit;
a file combining unit producing a combined image file from document files selected from the stored image data of the image memory, the file combining unit performing OR operations of the image data of the selected files such that black dots, fixed to start positions of the images of the selected files, match with each other; and
a transmission unit transmitting the combined image file, produced by the file combining unit, to one of the plurality of external stations through the network.

15. An image processing method for transmitting an image file from an image processing device to one of a plurality of external stations through a network, comprising:
- reading image data from a document;
- storing the read image data into an image memory;
- producing a combined image file from document files selected from the stored image data of the image memory;
- printing an image of the combined image file, wherein an operator determines offset values of the selected document files from the printed image of the combined image file;
- producing a newly combined image file from the selected document files based on the offset values; and
- transmitting the newly combined image file to one of the plurality of external stations through the network.

16. An image processing method for transmitting an image file from an image processing device to one of a plurality of external stations through a network, comprising:
- reading image data from a document;
- storing the read image data into an image memory;
- producing a combined image file from document files selected from the stored image data of the image memory, wherein OR operations of the image data of the selected files are performed such that black dots, fixed to start positions of the images of the selected files, match with each other; and
- transmitting the combined image file to one of the plurality of external stations through the network.

17. An image processing device which transmits an image file to one of a plurality of external stations through a network, comprising:
- a scanner unit reading image data from a document;
- an image memory storing the image data read by the scanner unit;
- a transmission unit transmitting an image file, derived from the stored image data of the image memory, to one of the plurality of external stations through the network;
- an image compression unit producing compressed image data from the image data, read by the scanner unit, before the transmission of the image file; and
- a compression ratio calculation unit calculating a compression ratio based on an available storage amount of the image memory and a memory space needed to store the image data read by the scanner unit;
- wherein the image processing device is configured to cause the image compression unit to produce the compressed image data from the image data by using the compression ratio calculated by the compression ratio calculation unit, and to cause the image memory to store the compressed image data into the image memory,
- the image processing device further comprising a determination unit determining whether the calculated compression ratio is above a maximum compression ratio, wherein the image processing device is configured to select the calculated compression ratio for use in the image compression unit when the calculated compression ratio is less than the maximum compression ratio.

18. The image processing device according to claim 17, further comprising a determination unit determining whether the calculated compression ratio is above a minimum compression ratio, wherein the image processing device is configured to select the minimum compression ratio for use in the image compression unit when the calculated compression ratio is less than the minimum compression ratio.

19. An image processing system comprising:
- an image processing device according to claim 17; and
- the plurality of external stations connected to the image processing device through a network,
- the plurality of external stations comprising a server which receives and stores image data sent by the image processing device.

20. An image processing method for transmitting an image file from an image processing device to one of a plurality of external stations through a network, comprising:
- reading image data from a document;
- storing the read image data into an image memory;
- transmitting an image file, derived from the stored image data of the image memory, to one of the plurality of external stations through the network;
- producing compressed image data from the read image data before the transmission of the image file; and
- calculating a compression ratio based on an available storage amount of the image memory and a memory space needed to store the read image data;
- wherein the compressed image data are produced from the read image data by using the calculated compression ratio, and the compressed image data are stored into the image memory,
- wherein the image processing method further causing the image compression unit to produce the compressed image data from the image data by using the compression ratio calculated by the compression ratio calculation unit, and causing the image memory to store the compressed image data into the image memory.

21. An image processing system comprising:
- an image processing device; and
- a plurality of external stations connected to the image processing device through a network;
- the image processing device comprising:
  - a scanner unit reading image data from a document;
  - an image memory storing the image data read by the scanner unit;
  - a transmission unit transmitting an image file, derived from the stored image data of the image memory, to one of the plurality of external stations through the network;
  - an image compression unit producing compressed image data from the image data, read by the scanner unit, before the transmission of the image file; and
  - a compression ratio calculation unit calculating a compression ratio based on an available storage amount of the image memory and a memory space needed to store the image data read by the scanner unit;
  - wherein the image processing device is configured to cause the image compression unit to produce the compressed image data from the image data by using the compression ratio calculated by the compression ratio calculation unit, and to cause the image memory to store the compressed image data into the image memory,
  - the image processing device further comprising a determination unit determining whether the calculated compression ratio is above a maximum compression ratio, wherein the image processing device is configured to select the calculated compression ratio for use in the image compression unit when the calculated compression ratio is less than the maximum compression ratio.

* * * * *